US009478096B2

(12) United States Patent
Arnone et al.

(10) Patent No.: US 9,478,096 B2
(45) **Date of Patent: *Oct. 25, 2016**

(54) AUTONOMOUS AGENT HYBRID SYSTEM

(71) Applicant: Gamblit Gaming, LLC, Glendale, CA (US)

(72) Inventors: Miles Arnone, Sherborn, MA (US); Frank Cire, Pasadena, CA (US); Eric Meyerhofer, Pasadena, CA (US)

(73) Assignee: Gamblit Gaming, LLC, Glendale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/823,951

(22) Filed: Aug. 11, 2015

(65) Prior Publication Data

US 2015/0348353 A1 Dec. 3, 2015

Related U.S. Application Data

(63) Continuation of application No. 14/461,344, filed on Aug. 15, 2014, now Pat. No. 9,135,776, which is a continuation of application No. 14/203,459, filed on Mar. 10, 2014, now Pat. No. 8,845,420, which is a (Continued)

(51) Int. Cl.
*G06F 17/00* (2006.01)
*G06F 19/00* (2011.01)
*G07F 17/32* (2006.01)

(52) U.S. Cl.
CPC ........... *G07F 17/3204* (2013.01); *G07F 17/32* (2013.01); *G07F 17/3227* (2013.01); *G07F 17/3244* (2013.01); *G07F 17/3267* (2013.01)

(58) Field of Classification Search
CPC ........................ G07F 17/3227; G07F 17/3267
See application file for complete search history.

(56) References Cited

U.S. PATENT DOCUMENTS 4,582,324 A 4/1986 Koza
5,413,357 A 5/1995 Schulze et al.

(Continued)

FOREIGN PATENT DOCUMENTS

JP 2001300098 A 10/2001
JP 2003111980 A 4/2003

(Continued)

OTHER PUBLICATIONS

U.S. Appl. No. 14/815,764 Arnone, et al. filed Jul. 31, 2015.

(Continued)

*Primary Examiner* — Steven J Hylinski
(74) *Attorney, Agent, or Firm* — Frank Cire

(57) ABSTRACT

Systems in accordance with embodiments of the invention operate an autonomous agent hybrid system including a real world controller constructed to provide a randomly generated payout of credits; an entertainment software controller constructed to execute an entertainment game providing outcomes based upon an autonomous agent action; and a game world controller coupled to the entertainment software controller and the real world controller via a network, and constructed to trigger the credit wager, wherein the game world controller utilizes an agency module that: configures an autonomous agent player profile which determines the autonomous agent action; detects the autonomous agent action taken by the autonomous agent where the autonomous agent action is a direct utilization by the autonomous agent of the enabling element within the entertainment game, wherein the autonomous agent action is taken by the autonomous agent without the player's supervision; and communicates, to the real world controller, an agent wager.

20 Claims, 18 Drawing Sheets

Related U.S. Application Data continuation of application No. PCT/US2013/030474, filed on Mar. 12, 2013.

(60) Provisional application No. 61/613,591, filed on Mar. 21, 2012, provisional application No. 61/610,826, filed on Mar. 14, 2012.

(56) References Cited

U.S. PATENT DOCUMENTS

| | | | |
|---|---|---|---|
| 5,718,429 | A | 2/1998 | Keller |
| 5,785,592 | A | 7/1998 | Jacobsen |
| 5,853,324 | A | 12/1998 | Kami et al. |
| 5,963,745 | A | 10/1999 | Collins et al. |
| 6,050,895 | A | 4/2000 | Luciano |
| 6,165,071 | A | 12/2000 | Weiss |
| 6,227,974 | B1 | 5/2001 | Eilat |
| 6,267,669 | B1 | 7/2001 | Luciano |
| 6,685,563 | B1 | 2/2004 | Meekins et al. |
| 6,712,693 | B1 | 3/2004 | Hettinger |
| 6,719,631 | B1 | 4/2004 | Tulley |
| 6,761,632 | B2 | 7/2004 | Bansemer et al. |
| 6,761,633 | B2 | 7/2004 | Riendeau |
| 6,764,397 | B1 | 7/2004 | Robb |
| 6,811,482 | B2 | 11/2004 | Letovsky |
| 7,056,210 | B2 | 6/2006 | Bansemer |
| 7,118,105 | B2 | 10/2006 | Benevento |
| 7,294,058 | B1 | 11/2007 | Slomiany |
| 7,326,115 | B2 | 2/2008 | Baerlocher |
| 7,361,091 | B2 | 4/2008 | Letovsky |
| 7,517,282 | B1 | 4/2009 | Pryor |
| 7,575,517 | B2 | 8/2009 | Parham et al. |
| 7,682,239 | B2 | 3/2010 | Friedman et al. |
| 7,720,733 | B2 | 5/2010 | Jung |
| 7,753,770 | B2 | 7/2010 | Walker et al. |
| 7,753,790 | B2 | 7/2010 | Nguyen |
| 7,766,742 | B2 | 8/2010 | Bennett et al. |
| 7,775,885 | B2 | 8/2010 | Van Luchene |
| 7,798,896 | B2 | 9/2010 | Katz |
| 7,828,657 | B2 | 11/2010 | Booth |
| 7,917,371 | B2 | 3/2011 | Jung et al. |
| 7,938,727 | B1 | 5/2011 | Konkle |
| 7,967,674 | B2 | 6/2011 | Baerlocher |
| 7,980,948 | B2 | 7/2011 | Rowe |
| 7,996,264 | B2 | 8/2011 | Kusumoto et al. |
| 8,012,023 | B2 | 9/2011 | Gates |
| 8,047,908 | B2 | 11/2011 | Walker |
| 8,047,915 | B2 | 11/2011 | Lyle |
| 8,060,829 | B2 | 11/2011 | Jung et al. |
| 8,075,383 | B2 | 12/2011 | Friedman et al. |
| 8,087,999 | B2 | 1/2012 | Oberberger |
| 8,113,938 | B2 | 2/2012 | Friedman et al. |
| 8,118,654 | B1 | 2/2012 | Nicolas |
| 8,128,487 | B2 | 3/2012 | Hamilton et al. |
| 8,135,648 | B2 | 3/2012 | Oram |
| 8,137,193 | B1 | 3/2012 | Kelly et al. |
| 8,142,272 | B2 | 3/2012 | Walker |
| 8,157,653 | B2 | 4/2012 | Buhr |
| 8,167,699 | B2 | 5/2012 | Inamura |
| 8,177,628 | B2 | 5/2012 | Manning |
| 8,182,338 | B2 | 5/2012 | Thomas |
| 8,182,339 | B2 | 5/2012 | Anderson |
| 8,187,068 | B2 | 5/2012 | Slomiany |
| 8,206,210 | B2 | 6/2012 | Walker |
| 8,308,544 | B2 | 11/2012 | Friedman |
| 8,475,266 | B2 | 7/2013 | Arnone |
| 8,480,470 | B2 | 7/2013 | Napolitano et al. |
| 8,622,809 | B1 | 1/2014 | Arora et al. |
| 2001/0004609 | A1 | 6/2001 | Walker et al. |
| 2001/0019965 | A1 | 9/2001 | Ochi |
| 2002/0022509 | A1 | 2/2002 | Nicastro |
| 2002/0090990 | A1 | 7/2002 | Joshi et al. |
| 2002/0175471 | A1 | 11/2002 | Faith |
| 2003/0060286 | A1 | 3/2003 | Walker et al. |
| 2003/0119576 | A1 | 6/2003 | McClintic et al. |
| 2003/0139214 | A1 | 7/2003 | Wolf et al. |
| 2003/0171149 | A1 | 9/2003 | Rothschild |
| 2003/0204565 | A1 | 10/2003 | Guo et al. |
| 2003/0211879 | A1 | 11/2003 | Englman |
| 2004/0092313 | A1 | 5/2004 | Saito et al. |
| 2004/0102238 | A1 | 5/2004 | Taylor |
| 2004/0121839 | A1 | 6/2004 | Webb |
| 2004/0225387 | A1 | 11/2004 | Smith |
| 2005/0003878 | A1 | 1/2005 | Updike |
| 2005/0096124 | A1 | 5/2005 | Stronach |
| 2005/0116411 | A1 | 6/2005 | Herrmann et al. |
| 2005/0192087 | A1 | 9/2005 | Friedman et al. |
| 2005/0233791 | A1 | 10/2005 | Kane |
| 2005/0233806 | A1 | 10/2005 | Kane et al. |
| 2005/0239538 | A1 | 10/2005 | Dixon |
| 2005/0269778 | A1 | 12/2005 | Samberg |
| 2005/0288101 | A1 | 12/2005 | Lockton et al. |
| 2006/0003823 | A1 | 1/2006 | Zhang |
| 2006/0003830 | A1 | 1/2006 | Walker et al. |
| 2006/0035696 | A1 | 2/2006 | Walker |
| 2006/0040735 | A1 | 2/2006 | Baerlocher |
| 2006/0068913 | A1 | 3/2006 | Walker et al. |
| 2006/0084499 | A1 | 4/2006 | Moshal |
| 2006/0084505 | A1 | 4/2006 | Yoseloff |
| 2006/0135250 | A1 | 6/2006 | Rossides |
| 2006/0154710 | A1 | 7/2006 | Serafat |
| 2006/0166729 | A1 | 7/2006 | Saffari et al. |
| 2006/0189371 | A1 | 8/2006 | Walker et al. |
| 2006/0223611 | A1 | 10/2006 | Baerlocher |
| 2006/0234791 | A1 | 10/2006 | Nguyen et al. |
| 2006/0240890 | A1 | 10/2006 | Walker |
| 2006/0246403 | A1 | 11/2006 | Monpouet et al. |
| 2006/0258433 | A1 | 11/2006 | Finocchio et al. |
| 2007/0026924 | A1 | 2/2007 | Taylor |
| 2007/0035548 | A1 | 2/2007 | Jung et al. |
| 2007/0038559 | A1 | 2/2007 | Jung et al. |
| 2007/0064074 | A1 | 3/2007 | Silverbrook et al. |
| 2007/0087799 | A1 | 4/2007 | Van Luchene |
| 2007/0093299 | A1 | 4/2007 | Bergeron |
| 2007/0099696 | A1 | 5/2007 | Nguyen et al. |
| 2007/0117641 | A1 | 5/2007 | Walker et al. |
| 2007/0129149 | A1 | 6/2007 | Walker |
| 2007/0142108 | A1 | 6/2007 | Linard |
| 2007/0156509 | A1 | 7/2007 | Jung et al. |
| 2007/0167212 | A1 | 7/2007 | Nguyen |
| 2007/0167239 | A1 | 7/2007 | O'Rourke |
| 2007/0173311 | A1 | 7/2007 | Morrow et al. |
| 2007/0191104 | A1 | 8/2007 | Van Luchene |
| 2007/0202941 | A1 | 8/2007 | Miltenberger |
| 2007/0203828 | A1 | 8/2007 | Jung et al. |
| 2007/0207847 | A1 | 9/2007 | Thomas |
| 2007/0259717 | A1 | 11/2007 | Mattice |
| 2007/0293306 | A1 | 12/2007 | Nee et al. |
| 2008/0004107 | A1 | 1/2008 | Nguyen et al. |
| 2008/0014835 | A1 | 1/2008 | Weston et al. |
| 2008/0015004 | A1 | 1/2008 | Gatto et al. |
| 2008/0064488 | A1 | 3/2008 | Oh |
| 2008/0070659 | A1 | 3/2008 | Naicker |
| 2008/0070690 | A1 | 3/2008 | Van Luchene |
| 2008/0070702 | A1 | 3/2008 | Kaminkow |
| 2008/0096665 | A1 | 4/2008 | Cohen |
| 2008/0108406 | A1 | 5/2008 | Oberberger |
| 2008/0108425 | A1 | 5/2008 | Oberberger |
| 2008/0113704 | A1 | 5/2008 | Jackson |
| 2008/0119283 | A1 | 5/2008 | Baerlocher |
| 2008/0146308 | A1 | 6/2008 | Okada |
| 2008/0161081 | A1 | 7/2008 | Berman |
| 2008/0176619 | A1 | 7/2008 | Kelly |
| 2008/0191418 | A1 | 8/2008 | Lutnick et al. |
| 2008/0195481 | A1 | 8/2008 | Lutnick |
| 2008/0248850 | A1 | 10/2008 | Schugar |
| 2008/0254893 | A1 | 10/2008 | Patel |
| 2008/0274796 | A1 | 11/2008 | Lube |
| 2008/0274798 | A1 | 11/2008 | Walker et al. |
| 2008/0311980 | A1 | 12/2008 | Cannon |
| 2008/0318668 | A1 | 12/2008 | Ching |
| 2009/0011827 | A1 | 1/2009 | Englman |
| 2009/0023489 | A1 | 1/2009 | Toneguzzo |
| 2009/0023492 | A1 | 1/2009 | Erfanian |
| 2009/0061974 | A1 | 3/2009 | Lutnick et al. |

(56) References Cited

U.S. PATENT DOCUMENTS

2009/0061975 A1 3/2009 Ditchev
2009/0061991 A1 3/2009 Popovich
2009/0061997 A1 3/2009 Popovich
2009/0061998 A1 3/2009 Popovich
2009/0061999 A1 3/2009 Popovich
2009/0082093 A1 3/2009 Okada
2009/0088239 A1 4/2009 Iddings
2009/0098934 A1 4/2009 Amour
2009/0118006 A1 5/2009 Kelly et al.
2009/0124344 A1 5/2009 Mitchell et al.
2009/0131158 A1 5/2009 Brunet De Courssou et al.
2009/0131175 A1 5/2009 Kelly et al.
2009/0143141 A1 6/2009 Wells
2009/0149233 A1 6/2009 Strause et al.
2009/0156297 A1 6/2009 Andersson et al.
2009/0176560 A1 7/2009 Herrmann et al.
2009/0176566 A1 7/2009 Kelly
2009/0181777 A1 7/2009 Christiani
2009/0221355 A1 9/2009 Dunaevsky et al.
2009/0239610 A1 9/2009 Olive
2009/0247272 A1 10/2009 Abe
2009/0270164 A1 10/2009 Seelig
2009/0275393 A1 11/2009 Kisenwether
2009/0291755 A1 11/2009 Walker et al.
2009/0309305 A1 12/2009 May
2009/0312093 A1 12/2009 Walker et al.
2009/0325686 A1 12/2009 Davis
2010/0004058 A1 1/2010 Acres
2010/0016056 A1 1/2010 Thomas et al.
2010/0029373 A1 2/2010 Graham et al.
2010/0035674 A1 2/2010 Slomiany
2010/0056247 A1 3/2010 Nicely
2010/0056260 A1 3/2010 Fujimoto
2010/0062836 A1 3/2010 Young
2010/0093420 A1 4/2010 Wright
2010/0093444 A1 4/2010 Biggar et al.
2010/0105454 A1 4/2010 Weber
2010/0120525 A1 5/2010 Baerlocher et al.
2010/0124983 A1 5/2010 Gowin et al.
2010/0137047 A1 6/2010 Englman et al.
2010/0174593 A1 7/2010 Cao
2010/0184509 A1 7/2010 Sylla et al.
2010/0203940 A1 8/2010 Alderucci et al.
2010/0210344 A1 8/2010 Edidin et al.
2010/0227672 A1 9/2010 Amour
2010/0227688 A1 9/2010 Lee
2010/0240436 A1 9/2010 Wilson et al.
2010/0304825 A1 12/2010 Davis
2010/0304839 A1 12/2010 Johnson
2010/0304842 A1 12/2010 Friedman et al.
2011/0009177 A1 1/2011 Katz
2011/0009178 A1 1/2011 Gerson
2011/0045896 A1 2/2011 Sak et al.
2011/0077087 A1 3/2011 Walker et al.
2011/0082571 A1 4/2011 Murdock et al.
2011/0105206 A1 5/2011 Rowe et al.
2011/0107239 A1 5/2011 Adoni
2011/0109454 A1 5/2011 McSheffrey
2011/0111820 A1 5/2011 Filipour
2011/0111837 A1 5/2011 Gagner
2011/0111841 A1 5/2011 Tessmer
2011/0118011 A1 5/2011 Filipour et al.
2011/0201413 A1 8/2011 Oberberger
2011/0207523 A1 8/2011 Filipour et al.
2011/0212766 A1 9/2011 Bowers
2011/0212767 A1 9/2011 Barclay
2011/0218028 A1 9/2011 Acres
2011/0218035 A1 9/2011 Thomas
2011/0230258 A1 9/2011 Van Luchene
2011/0230260 A1 9/2011 Morrow et al.
2011/0230267 A1 9/2011 Van Luchene
2011/0244944 A1 10/2011 Baerlocher
2011/0263312 A1 10/2011 De Waal
2011/0269522 A1 11/2011 Nicely et al.
2011/0275440 A1 11/2011 Faktor
2011/0287828 A1 11/2011 Anderson et al.
2011/0287841 A1 11/2011 Watanabe
2011/0312408 A1 12/2011 Okuaki
2011/0319169 A1 12/2011 Lam
2012/0004747 A1 1/2012 Kelly
2012/0028718 A1 2/2012 Barclay et al.
2012/0058814 A1 3/2012 Lutnick
2012/0077569 A1 3/2012 Watkins
2012/0108323 A1 5/2012 Kelly
2012/0135793 A1 5/2012 Antonopoulos
2012/0202587 A1 8/2012 Allen
2012/0302311 A1 11/2012 Luciano
2012/0322545 A1 12/2012 Arnone et al.
2013/0029760 A1 1/2013 Wickett
2013/0131848 A1 5/2013 Arnone et al.
2013/0190074 A1 7/2013 Arnone et al.
2013/0260869 A1 10/2013 Basallo et al.
2014/0087801 A1 3/2014 Nicely et al.
2014/0087808 A1 3/2014 Basallo et al.
2014/0087809 A1 3/2014 Leupp et al.
2014/0357350 A1 12/2014 Weingardt et al.

FOREIGN PATENT DOCUMENTS

JP 2004097610 A 4/2004
JP 2004166746 A 6/2004
WO 9851384 A1 11/1998
WO 2010087090 A1 8/2010
WO 2011109454 A1 9/2011
WO 2012139083 A1 10/2012
WO 2013059308 A1 4/2013

OTHER PUBLICATIONS

U.S. Appl. No. 14/815,774 Arnone, et al. filed Jul. 31, 2015.
U.S. Appl. No. 14/817,032 Arnone, et al. filed Aug. 3, 2015.
U.S. Appl. No. 14/586,645 Arnone, et al. filed Dec. 30, 2014.
U.S. Appl. No. 14/598,151 Arnone, et al. filed Jan. 15, 2015.
U.S. Appl. No. 14/601,063 Arnone, et al. filed Jan. 20, 2015.
U.S. Appl. No. 14/601,108 Arnone, et al. filed Jan. 20, 2015.
U.S. Appl. No. 14/608,000 Arnone, et al. filed Jan. 28, 2015.
U.S. Appl. No. 14/608,087 Arnone, et al. filed Jan. 28, 2015.
U.S. Appl. No. 14/608,093 Arnone, et al. filed Jan. 28, 2015.
U.S. Appl. No. 14/610,897 Arnone, et al. filed Jan. 30, 2015.
U.S. Appl. No. 14/611,077 Arnone, et al. filed Jan. 30, 2015.
U.S. Appl. No. 14/604,629 Arnone, et al. filed Jan. 23, 2015.
U.S. Appl. No. 14/625,475 Arnone, et al. filed Feb. 18, 2015.
U.S. Appl. No. 14/617,852 Arnone, et al. filed Feb. 9, 2015.
U.S. Appl. No. 14/627,428 Arnone, et al. filed Feb. 20, 2015.
U.S. Appl. No. 14/642,427 Arnone, et al. filed Mar. 9, 2015.
U.S. Appl. No. 14/665,991 Arnone, et al. filed Mar. 23, 2015.
U.S. Appl. No. 14/666,010 Arnone, et al. filed Mar. 23, 2015.
U.S. Appl. No. 14/666,022 Arnone, et al. filed Mar. 23, 2015.
U.S. Appl. No. 14/642,623 Arnone, et al. filed Mar. 9, 2015.
U.S. Appl. No. 14/663,337 Arnone, et al. filed Mar. 19, 2015.
U.S. Appl. No. 14/666,284 Arnone, et al. filed Mar. 23, 2015.
U.S. Appl. No. 14/679,885 Arnone, et al. filed Apr. 6, 2015.
U.S. Appl. No. 14/685,378 Arnone, et al. filed Apr. 13, 2015.
U.S. Appl. No. 14/686,675 Arnone, et al. filed Apr. 14, 2015.
U.S. Appl. No. 14/686,678 Arnone, et al. filed Apr. 14, 2015.
U.S. Appl. No. 14/701,430 Arnone, et al. filed Apr. 30, 2015.
U.S. Appl. No. 14/703,721 Arnone, et al. filed May 4, 2015.
U.S. Appl. No. 14/708,138 Arnone, et al. filed May 8, 2015.
U.S. Appl. No. 14/708,141 Arnone, et al. filed May 8, 2015.
U.S. Appl. No. 14/708,160 Arnone, et al. filed May 8, 2015.
U.S. Appl. No. 14/708,161 Arnone, et al. filed May 8, 2015.
U.S. Appl. No. 14/708,162 Arnone, et al. filed May 8, 2015.
U.S. Appl. No. 14/710,483 Arnone, et al. filed May 12, 2015.
U.S. Appl. No. 14/714,084 Arnone, et al. filed May 15, 2015.
U.S. Appl. No. 14/715,463 Arnone, et al. filed May 18, 2015.
U.S. Appl. No. 14/720,620 Arnone, et al. filed May 22, 2015.
U.S. Appl. No. 14/720,624 Arnone, et al. filed May 22, 2015.
U.S. Appl. No. 14/720,626 Arnone, et al. filed May 22, 2015.
U.S. Appl. No. 14/727,726 Arnone, et al. filed Jun. 1, 2015.

(56) References Cited

OTHER PUBLICATIONS

U.S. Appl. No. 14/730,183 Arnone, et al. filed Jun. 3, 2015.
U.S. Appl. No. 14/731,321 Arnone, et al. filed Jun. 4, 2015.
U.S. Appl. No. 14/740,078 Arnone, et al. filed Jun. 15, 2015.
U.S. Appl. No. 14/742,517 Arnone, et al. filed Jun. 17, 2015.
U.S. Appl. No. 14/743,708 Arnone, et al. filed Jun. 18, 2015.
U.S. Appl. No. 14/746,731 Arnone, et al. filed Jun. 22, 2015.
U.S. Appl. No. 14/748,122 Arnone, et al. filed Jun. 23, 2015.
U.S. Appl. No. 14/788,581 Arnone, et al. filed Jun. 30, 2015.
U.S. Appl. No. 14/793,685 Arnone, et al. filed Jul. 7, 2015.
U.S. Appl. No. 14/793,704 Arnone, et al. filed Jul. 7, 2015.
U.S. Appl. No. 14/797,016 Arnone, et al. filed Jul. 10, 2015.
U.S. Appl. No. 14/799,481 Arnone, et al. filed Jul. 14, 2015.
itl.nist.gov, Extreme Studentized Deviate Test, [online], Sep. 2010, Internet<URL:http://www.itl.nist.gov/div898/software/dataplot/refman1/auxillar/esd.htm>, entire document, National Institute of Standards and Technology (NIST), U.S. Department of Commerce.
Changing the Virtual Self: Avatar Transformations in Popular Games; Barr et al., Victoria Univ., NZ, 2006.
Real-Time Multimodal Human-Avatar Interaction; Li et al., IEEE (Video Technology) vol. 18, No. 4, 2008.
U.S. Appl. No. 13/854,658, Arnone, et al., filed Apr. 1, 2013.
U.S. Appl. No. 13/855,676, Arnone, et al., filed Apr. 2, 2013.
U.S. Appl. No. 13/872,946, Arnone, et al., filed Apr. 29, 2013.
U.S. Appl. No. 13/886,245, Arnone, et al., filed May 2, 2013.
U.S. Appl. No. 13/888,326, Arnone, et al., filed May 6, 2013.
U.S. Appl. No. 13/890,207, Arnone, et al., filed May 8, 2013.
U.S. Appl. No. 13/896,783, Arnone, et al., filed May 17, 2013.
U.S. Appl. No. 13/898,222, Arnone, et al., filed May 20, 2013.
U.S. Appl. No. 13/900,363, Arnone, et al., filed May 22, 2013.
U.S. Appl. No. 13/903,895, Arnone, et al., filed May 28, 2013.
U.S. Appl. No. 13/917,513, Arnone, et al., filed Jun. 13, 2013.
U.S. Appl. No. 13/917,529, Arnone, et al., filed Jun. 13, 2013.
U.S. Appl. No. 13/920,031, Arnone, et al., filed Jun. 17, 2013.
U.S. Appl. No. 13/928,166, Arnone, et al., filed Jun. 26, 2013.
U.S. Appl. No. 13/935,410, Arnone, et al., filed Jul. 3, 2013.
U.S. Appl. No. 13/935,468, Arnone, et al., filed Jul. 3, 2013.
U.S. Appl. No. 13/686,876, Arnone, et al., filed Nov. 27, 2012.
U.S. Appl. No. 13/944,662, Arnone, et al., filed Jul. 17, 2013.
U.S. Appl. No. 13/962,815, Arnone, et al., filed Aug. 8, 2013.
U.S. Appl. No. 13/962,839, Meyerhofer, et al., filed Aug. 8, 2013.
U.S. Appl. No. 14/018,315, Arnone, et al., filed Sep. 4, 2013.
U.S. Appl. No. 14/019,384, Arnone, et al., filed Sep. 5, 2013.
U.S. Appl. No. 14/023,432, Arnone, et al., filed Sep. 10, 2013.
U.S. Appl. No. 13/600,671, Arnone, et al., filed Aug. 31, 2012.
U.S. Appl. No. 13/582,408, Arnone, et al., filed Sep. 26, 2012.
U.S. Appl. No. 13/849,458, Arnone, et al., filed Mar. 22, 2013.
U.S. Appl. No. 14/135,562, Arnone, et al., filed Dec. 19, 2013.
U.S. Appl. No. 14/080,767, Arnone, et al., filed Nov. 14, 2013.
U.S. Appl. No. 14/043,838, Arnone, et al., filed Oct. 1, 2013.
U.S. Appl. No. 14/162,735, Arnone, et al., filed Jan. 23, 2014.
U.S. Appl. No. 14/161,230, Arnone, et al., filed Jan. 22, 2014.
U.S. Appl. No. 14/083,331, Arnone, et al., filed Nov. 18, 2013.
U.S. Appl. No. 14/014,310, Arnone, et al., filed Aug. 29, 2013.
U.S. Appl. No. 14/152,953, Arnone, et al., filed Jan. 10, 2014.
U.S. Appl. No. 14/162,724, Arnone, et al., filed Jan. 23, 2014.
U.S. Appl. No. 14/104,897, Arnone, et al., filed Dec. 12, 2013.
U.S. Appl. No. 14/174,813 Arnone, et al., filed Feb. 6, 2014.
U.S. Appl. No. 14/175,986 Arnone, et al., filed Feb. 7, 2014.
U.S. Appl. No. 14/176,014 Arnone, et al., filed Feb. 7, 2014.
U.S. Appl. No. 14/179,487 Arnone, et al., filed Feb. 12, 2014.
U.S. Appl. No. 14/179,492 Arnone, et al., filed Feb. 12, 2014.
U.S. Appl. No. 14/181,190 Arnone, et al., filed Feb. 14, 2014.
U.S. Appl. No. 14/186,393 Arnone, et al., filed Feb. 21, 2014.
U.S. Appl. No. 14/188,587 Arnone, et al., filed Feb. 24, 2014.
U.S. Appl. No. 14/185,847 Arnone, et al., filed Feb. 20, 2014.
U.S. Appl. No. 14/203,459 Arnone, et al., filed Mar. 10, 2014.
U.S. Appl. No. 14/205,272 Arnone, et al., filed Mar. 11, 2014.
U.S. Appl. No. 14/205,303 Arnone, et al., filed Mar. 11, 2014.
U.S. Appl. No. 14/205,306 Arnone, et al., filed Mar. 11, 2014.
U.S. Appl. No. 14/209,485 Arnone, et al., filed Mar. 13, 2014.
U.S. Appl. No. 14/214,310 Arnone, et al., filed Mar. 14, 2014.
U.S. Appl. No. 14/222,520 Arnone, et al., filed Mar. 21, 2014.
U.S. Appl. No. 14/253,813 Arnone, et al., filed Apr. 15, 2014.
U.S. Appl. No. 14/255,253 Arnone, et al., filed Apr. 17, 2014.
U.S. Appl. No. 14/255,919 Arnone, et al. filed Apr. 17, 2014.
U.S. Appl. No. 14/263,988 Arnone, et al. filed Apr. 28, 2014.
U.S. Appl. No. 14/270,335 Arnone, et al. filed May 5, 2014.
U.S. Appl. No. 14/271,360 Arnone, et al. filed May 6, 2014.
U.S. Appl. No. 13/961,849 Arnone, et al. filed Aug. 7, 2013.
U.S. Appl. No. 13/746,850 Arnone, et al. filed Jan. 22, 2013.
U.S. Appl. No. 14/288,169 Arnone, et al. filed May 27, 2014.
U.S. Appl. No. 14/304,027 Arnone, et al. filed Jun. 13, 2014.
U.S. Appl. No. 14/306,187 Arnone, et al. filed Jun. 16, 2014.
U.S. Appl. No. 14/312,623 Arnone, et al. filed Jun. 23, 2014.
U.S. Appl. No. 14/330,249 Arnone, et al. filed Jul. 14, 2014.
U.S. Appl. No. 14/339,142 Arnone, et al. filed Jul. 23, 2014.
U.S. Appl. No. 14/458,206 Arnone, et al. filed Aug. 12, 2014.
U.S. Appl. No. 14/461,344 Arnone, et al. filed Aug. 15, 2014.
U.S. Appl. No. 14/462,516 Arnone, et al. filed Aug. 18, 2014.
U.S. Appl. No. 14/467,646 Meyerhofer, et al. filed Aug. 25, 2014.
U.S. Appl. No. 14/474,023 Arnone, et al. filed Aug. 29, 2014.
U.S. Appl. No. 14/486,895 Arnone, et al. filed Sep. 15, 2014.
U.S. Appl. No. 14/507,206 Arnone, et al. filed Oct. 6, 2014.
U.S. Appl. No. 14/521,338 Arnone, et al. filed Oct. 22, 2014.
U.S. Appl. No. 14/535,808 Arnone, et al. filed Nov. 7, 2014.
U.S. Appl. No. 14/535,816 Arnone, et al. filed Nov. 7, 2014.
U.S. Appl. No. 14/536,231 Arnone, et al. filed Nov. 7, 2014.
U.S. Appl. No. 14/536,280 Arnone, et al. filed Nov. 7, 2014.
U.S. Appl. No. 14/549,137 Arnone, et al. filed Nov. 20, 2014.
U.S. Appl. No. 14/550,802 Arnone, et al. filed Nov. 21, 2014.
U.S. Appl. No. 14/555,401 Arnone, et al. filed Nov. 26, 2014.
U.S. Appl. No. 14/559,840 Arnone, et al. filed Dec. 3, 2014.
U.S. Appl. No. 14/564,834 Arnone, et al. filed Dec. 9, 2014.
U.S. Appl. No. 14/570,746 Arnone, et al. filed Dec. 15, 2014.
U.S. Appl. No. 14/570,857 Arnone, et al. filed Dec. 15, 2014.
U.S. Appl. No. 14/586,626 Arnone, et al. filed Dec. 30, 2014.
U.S. Appl. No. 14/586,639 Arnone, et al. filed Dec. 30, 2014.

AUTONOMOUS AGENT HYBRID SYSTEM

CROSS REFERENCE TO RELATED APPLICATIONS

This application is a continuation of U.S. patent application Ser. No. 14/461,344 filed on Aug. 15, 2014, which is a continuation of U.S. patent application Ser. No. 14/203,459 filed on Mar. 10, 2014, which is a continuation of Patent Cooperation Treaty Application No. PCT/US13/30474, filed Mar. 12, 2013, which claims the benefit of U.S. Provisional Patent Application No. 61/610,826 filed Mar. 14, 2012, and U.S. Provisional Patent Application No. 61/613,591 filed Mar. 21, 2012, the contents of each of which are hereby incorporated by reference in their entirety as if stated in full herein. This application references Patent Cooperation Treaty Application No. PCT/US11/26768, filed Mar. 1, 2011, Patent Cooperation Treaty Application No. PCT/US11/63587, filed Dec. 6, 2011, and Patent Cooperation Treaty Application No. PCT/US12/58156, filed Sep. 29, 2012, the contents of each of which are hereby incorporated by reference in their entirety as if stated in full herein.

FIELD OF THE INVENTION

Embodiments of the present invention are generally related to gaming and more specifically to autonomous agent hybrid games that include both an entertainment game and a gambling game where autonomous agents can execute within the entertainment game and trigger randomly generated payouts from an agent wager in the gambling game.

BACKGROUND

The gaming machine manufacturing industry has traditionally developed gaming machines with a gambling game. A gambling game is typically a game of chance, which is a game where the outcome of the game is generally dependent solely on chance (such as a slot machine). A game of chance can be contrasted with a game of skill where the outcome of the game can depend upon a player's skill with the game. Gambling games are typically not as interactive and do not include graphics as sophisticated as an entertainment game, which is a game of skill such as a video game.

SUMMARY OF THE INVENTION

An embodiment includes a real world controller constructed to provide a randomly generated payout of real world credits from a wager of real world credits in a gambling game; an entertainment software controller constructed to execute an entertainment game providing outcomes based upon at least one autonomous agent action taken by an autonomous agent in the entertainment game; and a game world controller coupled to the entertainment software controller and the real world controller via a network, the game world controller constructed to trigger the wager of real world credits in the gambling game on the basis of utilization of an enabling element by the autonomous agent, wherein the game world controller utilizes an agency module that: configures an autonomous agent player profile for the autonomous agent, where the autonomous agent action is determined by the configuration of the autonomous agent player profile; detects via the network from the entertainment software controller the autonomous agent action taken by the autonomous agent in the entertainment game where the autonomous agent action is a direct utilization by the autonomous agent of the enabling element within the entertainment game, wherein the autonomous agent action is taken by the autonomous agent within the entertainment game without the player's supervision; and communicates, to the real world controller, an agent wager based on the autonomous agent action.

In a further embodiment, the agency module configures the autonomous agent player profile based upon player instructions received via a user interface during entertainment game gameplay.

In a further embodiment, the autonomous agent player profile is configured with an allocation of real world credits from the player profile associated with the player instructions, where the real world credits allocated to the autonomous agent player profile are configured to be wagered in the agent wager.

In a further embodiment, the agent player action involved with skillful execution of the entertainment game is configured to mimic historical player instructions based upon an agent player profile configuration rule that utilizes historical player instructions.

In a further embodiment, the autonomous agent player action involved with skillful execution of the entertainment game during entertainment game gameplay executed by the entertainment software controller is determined by a configuration of logic stored in the agent player profile.

In a further embodiment, the agent wager is made with wager terms generated with a wager term configuration rule based upon the agent player profile.

In a further embodiment, the wager terms are configured in accordance with a wager term configuration rule based upon an amount of real world credits associated with the agent player profile.

In a further embodiment, different agent player profiles yield different wager terms for the agent wager.

In a further embodiment, different autonomous agent player actions yield different wager terms for the agent wager in accordance with a wager term configuration rule.

In a further embodiment, the player associated with the player instructions and the autonomous agent associated with the autonomous agent player profile are engaged in the same entertainment game gameplay session.

An embodiment includes an entertainment software controller constructed to execute an entertainment game providing outcomes based upon at least one autonomous agent action taken by an autonomous agent in the entertainment game; and a game world controller coupled, via a network, to the entertainment software controller and to a real world controller providing a randomly generated payout of real world credits from a wager of real world credits, the game world controller constructed to trigger the wager of real world credits on the basis of utilization of an enabling element by the autonomous agent, wherein the game world controller utilizes an agency module that: configures an autonomous agent player profile for the autonomous agent, where the autonomous agent action is determined by the configuration of the autonomous agent player profile; detects via the network from the entertainment software controller the autonomous agent action taken by the autonomous agent in the entertainment game where the autonomous agent action is a direct utilization by the autonomous agent of the enabling element within the entertainment game, wherein the autonomous agent action is taken by the autonomous agent within the entertainment game without the player's supervision; and communicates, to the real world controller, an agent wager based on the autonomous agent action.

DETAILED DESCRIPTION

Figure 1:
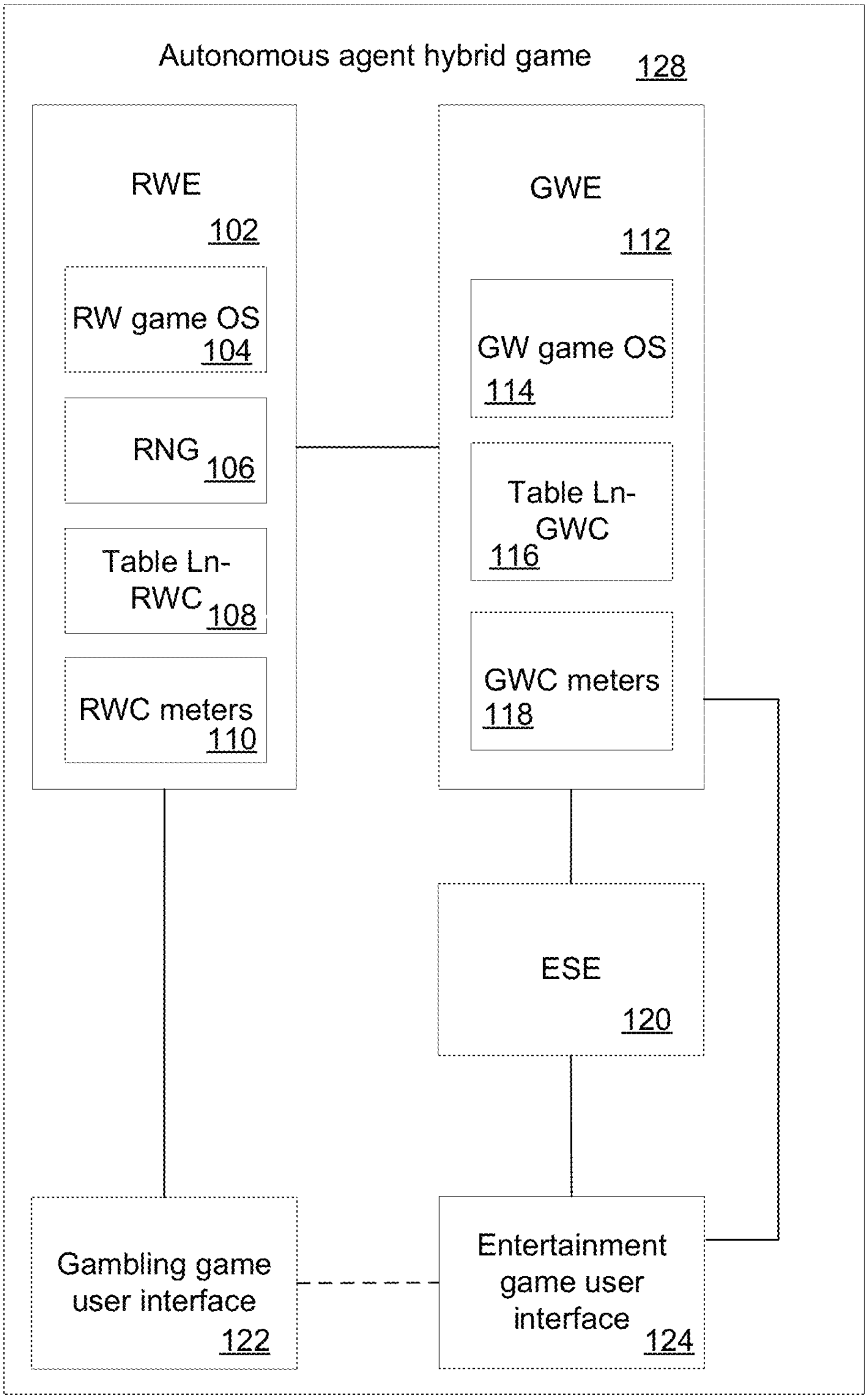
FIG. 1 illustrates an autonomous agent hybrid game in accordance with an embodiment of the invention.

Turning now to the drawings, systems and methods for operation of autonomous agent hybrid games are illustrated. In several embodiments, an autonomous agent hybrid game is a form of a hybrid game that integrates an agency module with both a gambling game that includes a real world engine (RWE) which manages the gambling game, as well as an entertainment game that includes a game world engine (GWE) which manages the entertainment portion of a game, and an entertainment software engine (ESE) which executes the entertainment game for user entertainment. In certain embodiments, the autonomous agent hybrid game also includes a user interface associated with either or both the gambling game and the entertainment game. A player of an autonomous agent hybrid game is the electronic representation of interactions, typically via a user interface, associated with a player profile of the autonomous agent hybrid game. In operation of an autonomous agent hybrid game, a player or an autonomous agent acts upon various types of elements of the entertainment game in a game world environment. Elements are a limited resource consumed within an entertainment game to advance entertainment game gameplay. In playing the entertainment game using the elements, a player can (optionally) consume and accrue game world credits (GWC) within the entertainment game. These credits can be in the form of (but are not limited to) game world objects, experience points, skill points, or points generally that are awarded or earned by the player for the player's play of the entertainment game. Wagers are made in the gambling game using real world credits (RWC). The real world credits can be credits in an actual currency, or can be credits in a virtual currency which has real world value. Gambling outcomes from the gambling game can cause consumption, loss or accrual of RWC. In addition, gambling outcomes in the gambling game can influence elements in the entertainment game such as (but not limited to) by restoring a consumed element, causing the loss of an element, restoration or placement of a fixed element. In certain embodiments, gambling games can facilitate the wager of GWC for a randomly generated payout of GWC or a wager of elements for a randomly generated payout of elements. In particular embodiments, an amount of GWC and/or elements used as part of a wager can have a RWC value if cashed out of an autonomous agent hybrid game gameplay session. Example elements include enabling elements (EE) which are elements that enable a player's play of the entertainment game and whose consumption by the player while playing the entertainment game can trigger a wager in a gambling game. Another example of an element is a reserve enabling element (REE), which is an element that converts into one or more enabling elements upon occurrence of a release event in an autonomous agent hybrid game gameplay. Other types of elements include actionable elements (AE) which are elements that are acted upon to trigger a wager in the gambling game and cannot be restorable during normal play of the entertainment game. In progressing through entertainment game gameplay, elements can be utilized by a player or autonomous agent during interactions with a controlled entity (CE) which is a character, entity, inanimate object, device or other object under control of a player. Also, entertainment game gameplay progress can be dependent upon: a required object (RO) which is a specific object in an entertainment game acted upon for an AE to be completed (such as but not limited to a specific key needed to open a door); a required environmental condition (REC) which is a game state present within an entertainment game for an AE to be completed (such as but not limited to daylight whose presence enables a character to walk through woods); or a controlled entity characteristic (CEC) which is a status of the CE within an entertainment game for an AE to be completed (such as but not limited to a CE to have full health points before entering battle). Although various gameplay resources, such as but not limited to GWC, RWC and elements are discussed above, any gameplay resource can be utilized to advance autonomous agent hybrid game gameplay as appropriate to the specification of a specific application in accordance with embodiments of the invention. Various hybrid games are discussed in Patent Cooperation Treaty Application No. PCT/US11/26768, filed Mar. 1, 2011, entitled ENRICHED GAME PLAY ENVIRONMENT (SINGLE and/or MULTIPLAYER) FOR CASINO APPLICATIONS and Patent Cooperation Treaty Application No. PCT/US11/63587, filed Dec. 6, 2011, entitled ENHANCED SLOT-MACHINE FOR CASINO APPLICATIONS each disclosure of which is hereby incorporated by reference in its entirety.

In many embodiments, an autonomous agent hybrid game utilizes an agency module to allocate an agent wager payout resulting from at least one agent player action generated from an agent player profile configured by a player of the autonomous agent hybrid game. An agent is an autonomous player with agent player actions during entertainment game gameplay determined by the configuration of the agent player profile. An agent player profile can be configured using an agency module in accordance with at least one agent player profile configuration rule based upon instructions received via a user interface. These instructions can be generated by a player of the autonomous agent hybrid game. The agent player profile configuration rules can include any rule that configures any aspect of an agent player profile based upon player instructions received via a user interface including but not limited to: performance of agent player actions, gameplay resources available to an agent player during autonomous agent hybrid game gameplay, wager terms that govern an agent wager and definitions of an agent gameplay gambling event occurrence. In numerous embodiments, an agent player action is an action during autonomous agent hybrid game gameplay that can be performed by an agent or to an agent. In a number of embodiments, gameplay resources available to an agent can include gameplay resources that are associated with an agent player profile upon initiation of an entertainment game gameplay session or allocated to an agent player profile from another player profile. In certain embodiments, RWC can be allocated as a gameplay resource from a player profile to an agent player profile that can be wagered upon being triggered by an agent gameplay gambling event occurrence. In several embodiments, an agent player profile can be configured prior to commencement of an entertainment game. In a number of embodiments, an agent player profile can be configured during an entertainment game gameplay session.

In several embodiments, an agency module can communicate an agent gameplay gambling event occurrence to the real world engine. An agent gameplay gambling event occurrence can be defined by at least one agent gambling event occurrence rule based upon at least one agent player action during entertainment game gameplay. An agent gambling event occurrence rule can define an agent gameplay gambling event occurrence as any event that can occur during entertainment game gameplay involving an agent, such as but not limited to accumulation of a certain quantity of gameplay resources associated with an agent player profile, elapse of an amount of time in an entertainment game gameplay session in which an agent is active, consumption of an element or performance of an agent player action. The gameplay gambling event occurrence can trigger an agent wager in the gambling game executed by the real world engine. An agent wager is a wager of gameplay resources associated with the agent player profile for a randomly generated payout of gameplay resources. In several embodiments, an agent wager can be made with wager terms generated with at least one wager term configuration rule based upon the agent player profile and/or the gameplay gambling event occurrence that triggered the agent wager. Wager terms can be configured based upon any aspect of the agent player profile, such as but not limited to an amount of RWC associated with the agent player profile during a gameplay gambling event occurrence, the experience level that characterizes the agent player profile or past agent wagers associated with the agent player profile. Similarly, wager terms can be configured based upon any aspect of the agent gameplay gambling event occurrence, such as but not limited to the quantity of gameplay resources associated with an agent player profile, an element consumed (such as an actionable element) or the performance of an agent player action that is part of the agent gameplay gambling event occurrence.

In numerous embodiments, a payout from the agent wager is allocated to a player profile based upon the agent player profile in accordance with an agent wager payout rule. An agent wager payout rule can allocate a randomly generated payout from an agent wager in any manner including, but not limited to, entirely to the agent player profile associated with the agent of the agent player action that triggered the agent wager, entirely to a player profile (such as but not limited to the player profile associated with the player instructions used to configure the agent player profile) or partially to a player profile or to the agent player profile. In certain embodiments, the agent wager payout rule can be stored and configured as part of an agent player profile.

In several embodiments, an agency database can be utilized to store information that enables an agency module to function, such as but not limited to agent player profiles, player profiles, agent player profile configuration rules, agent gameplay gambling event occurrences, agent gambling event occurrence rules, wager terms associated with agent wagers and agent wager payout rules. Information in an agency database can be loaded from a remote server accessible to the agency module over a network or stored locally on an autonomous agent hybrid game. In certain embodiments, a server maintains an agency database accessible to multiple autonomous agent hybrid games over a network. In other embodiments, each autonomous agent hybrid game maintains an agency database locally that is accessible by the agency module or other remote agency modules over a network.

In numerous embodiments, an agency module can be implemented locally on an autonomous agent hybrid game within the GWE, remotely on an agency server accessible to an autonomous agent hybrid game via a network, or as a distributed system where processes of an agency module occur locally on an autonomous agent hybrid game and on a remote server.

Autonomous agent hybrid games in accordance with embodiments of the invention are discussed below.

Autonomous Agent Hybrid Games

In many embodiments, an autonomous agent hybrid game integrates high-levels of entertainment content with a game of skill (entertainment game), a gambling experience with a game of chance (gambling game). An autonomous agent hybrid game provides for random outcomes independent of player skill while providing that the user's gaming experience (as measured by obstacles/challenges encountered, time of play and other factors) is shaped by the player's skill. The autonomous agent hybrid game can also utilize an agency module to allocate a gambling game agent wager payout resulting from at least one agent player action generated from an agent player profile configured by a player of the autonomous agent hybrid game. An autonomous agent hybrid game in accordance with an embodiment of the invention is illustrated in FIG. 1. The autonomous agent hybrid game 128 includes a RWE 102, GWE 112, ESE 120, gambling game user interface 122 and entertainment game user interface 124. The two user interfaces can be part of the same user interface but are separate in the illustrated embodiment. The RWE 102 is connected with the GWE 112 and the gambling game user interface 122. The ESE 120 is connected with the GWE 112 and the entertainment game user interface 124. The GWE 112 is connected also with the entertainment game user interface 124.

In several embodiments, the RWE 102 is the operating system for the gambling game of the autonomous agent hybrid game 128 and controls and operates the gambling game. The operation of a gambling game is enabled by RWC, such as money or other real world funds. A gambling game can increase or decreases an amount of RWC based on random gambling outcomes, where the gambling proposition of a gambling game is typically regulated by gaming control bodies. In many embodiments, the RWE includes a RW operating system (OS) 104, random number generator (RNG) 106, level n real-world credit pay tables (Table Ln-RWC) 108, RWC meters 110 and other software constructs that enable a game of chance to offer a fair and transparent gambling proposition, and to contain the auditable systems and functions that can enable the game to obtain gaming regulatory body approval.

A random number generator (RNG) 106 includes software and/or hardware algorithms and/or processes, which are used to generate random outcomes. A level n real-world credit pay table (Table Ln-RWC) 108 is a table that can be used in conjunction with a random number generator (RNG) 106 to dictate the real world credits (RWC) earned as a function of sponsored gameplay and is analogous to the pay tables used in a conventional slot machine. Table Ln-RWC payouts are independent of player skill. There can be one or a plurality of Table Ln-RWC pay tables 108 contained in a gambling game, the selection of which can be determined by factors including (but not limited to) game progress a player has earned, and/or bonus rounds which a player can be eligible for. Real world credits (RWC) are credits analogous to slot machine game credits, which are entered into a gambling game by the user, either in the form of money such as hard currency or electronic funds. RWCs can be decremented or augmented based on the outcome of a random number generator according to the Table Ln-RWC real world credits pay table 108, independent of player skill. In certain embodiments, an amount of RWC can be used as criteria in order to enter higher ESE game levels. RWC can be carried forward to higher game levels or paid out if a cash out is opted for by a player. The amount of RWC used to enter a specific level of the game level n need not be the same for each level.

In many embodiments, the GWE 112 manages the overall autonomous agent hybrid game operation, with the RWE 102 and the ESE 120 effectively being support units to the GWE 112. In several embodiments, the GWE 112 contains mechanical, electronic and software system for an entertainment game. The GWE 112 includes an operating system (OS) 114 that provides control of the entertainment game. The GWE additionally contains a level n game world credit pay table (Table Ln-GWC) 116 from where to take input from this table to affect the play of the entertainment game. The GWE 112 can further couple to the RWE 102 to determine the amount of RWC available on the game and other metrics of wagering on the gambling game (and potentially affect the amount of RWC in play on the RWE). The GWE additionally contains various audit logs and activity meters (such as the GWC meter) 118. The GWE 112 can also couple to a centralized server for exchanging various data related to the player and their activities on the game. The GWE 112 furthermore couples to the ESE 120.

In many embodiments, a level n game world credit pay table (Table Ln-GWC) 116 dictates the GWC earned as a function of player skill in the nth level of the game. The payouts governed by this table are dependent upon player skill and sponsored gameplay at large and can or cannot be coupled to a random number generator. In several embodiments, game world credits (GWC) are player points earned or depleted as a function of player skill, specifically as a function of player performance in the context of the game. GWC is analogous to the score in a typical video game. Each entertainment game has one or more scoring criterion, embedded within the Table Ln-GWC 116 that reflects player performance against the goal(s) of the game. GWC can be carried forward from one level of sponsored gameplay to another, and ultimately paid out in various manners such as directly in cash, or indirectly such as by earning entrance into a sweepstakes drawing, or earning participation in, or victory in, a tournament with prizes. GWC can be stored on a player tracking card or in a network-based player tracking system, where the GWC is attributed to a specific player.

In certain embodiments, the operation of the GWE does not affect the RWE's gambling operation except for player choice parameters that are allowable in slot machines including but not limited to wager terms such as but not limited to a wager amount, how fast the player wants to play (by pressing a button or pulling the handle of a slot machine) and/or agreement to wager into a bonus round. In this sense, the RWE 102 provides a fair and transparent, non-skill based gambling proposition co-processor to the GWE 112. In the illustrated embodiment, the communication link shown between the GWE 112 and the RWE 102 allows the GWE 112 to obtain information from the RWE 102 as to the amount of RWC available in the gambling game. The communication link can also convey a status operation of the RWE (such as on-line or tilt). The communication link can further communicate the various gambling control factors which the RWE 102 uses as input, such as the number of RWC consumed per game or the player's election to enter a jackpot round. In FIG. 1, the GWE 112 is also shown as connecting to the player's user interface directly, as this can be utilized to communicate certain entertainment game club points, player status, control the selection of choices and messages which a player can find useful in order to adjust the entertainment game experience or understand their gambling status in the RWE 102.

In various embodiments, the ESE 120 manages and controls the visual, audio, and player control for the entertainment game. In certain embodiments, the ESE 120 accepts input from a player through a set of hand controls, and/or head, gesture, and/or eye tracking systems and outputs video, audio and/or other sensory output to a user interface. In many embodiments, the ESE 120 can exchange data with and accept control information from the GWE 112. In several embodiments an ESE 120 can be implemented using a personal computer (PC), a Sony PlayStation® (a video game console developed by Sony Computer Entertainment of Tokyo Japan), or Microsoft Xbox® (a video game console developed by Microsoft Corporation of Redmond, Wash.) running a specific entertainment game software program. In numerous embodiments, an ESE can be an electromechanical game system of an autonomous agent hybrid game that is an electromechanical hybrid game. An electromechanical hybrid game executes an electromechanical game for player entertainment. The electromechanical game can be any game that utilizes both mechanical and electrical components, where the game operates as a combination of mechanical motions performed by at least one player or the electromechanical game itself. Various electromechanical hybrid games are discussed in Patent Cooperation Treaty Application No. PCT/US12/58156, filed Sep. 29, 2012, the contents of which are hereby incorporated by reference in their entirety.

The ESE 120 operates mostly independently from the GWE 112, except that via the interface, the GWE 112 can send certain entertainment game control parameters and elements to the ESE 120 to affect its play, such as (but not limited to) what level of character to be using, changing the difficulty level of the game, changing the type of gun or car in use, and/or requesting potions to become available or to be found by the character. These game control parameters and elements can be based on a gambling outcome of a gambling game that was triggered by an element in the entertainment game being acted upon by the player. The ESE 120 can accept this input from the GWE 112, make adjustments, and continue the play action all the while running seamlessly from the player's perspective. The ESE's operation is mostly skill based, except for where the ESE's processes can inject complexities into the game by chance in its normal operation to create unpredictability in the entertainment game. Utilizing this interface, the ESE 120 can also communicate player choices made in the game to the GWE 112, such as but not limited to selection of a different gun, and/or the player picking up a special potion in the GW environment. The GWE's job in this architecture, being interfaced thusly to the ESE 120, is to allow the transparent coupling of entertainment software to a fair and transparent random chance gambling game, providing a seamless perspective to the player that they are playing a typical popular entertainment game (which is skill based). In certain embodiments, the ESE 120 can be used to enable a wide range of entertainment games including but not limited to popular titles from arcade and home video games, such as but not limited to Gears of War (a third person shooter game developed by Epic Games of Cary, N.C.), Time Crisis (a shooter arcade game developed by Namco Ltd of Tokyo, Japan), or Madden Football (an American football video game developed by EA Tiburon of Maitland, Fla.). Providers of such software can provide the previously described interface by which the GWE 120 can request amendments to the operation of the ESE software in order to provide seamless and sensible operation as both a gambling game and an entertainment game.

In several embodiments, the RWE 102 can accept a trigger to run a gambling game in response to actions taken by the player in the entertainment game as conveyed by the ESE 120 to the GWE 112, or as triggered by the GWE 112 based on its algorithms, background to the overall game from the player's perspective, but can provide information to the GWE 112 to expose the player to certain aspects of the gambling game, such as (but not limited to) odds, amount of RWC in play, and amount of RWC available. The RWE 102 can accept modifications in the amount of RWC wagered on each individual gambling try, or the number of games per minute the RWE 102 can execute, entrance into a bonus round, and other factors, all the while these factors can take a different form than that of a typical slot machine. An example of a varying wager amount that the player can choose can include but is not limited to gameplay with a more powerful character, a more powerful gun, or a better car. These choices can increase or decrease the amount wagered per individual gambling game, in the same manner that a standard slot machine player can decide to wager more or less credits for each pull of the handle. In several embodiments, the RWE 102 can communicate a number of factors back and forth to the GWE 112, via an interface, such increase/decrease in wager being a function of the player's decision making as to their operational profile in the entertainment game (such as but not limited to the power of the character, gun selection or car choice). In this manner, the player is always in control of the per game wager amount, with the choice mapping to some parameter or component that is applicable to the entertainment game experience of the hybrid game. In a particular embodiment, the RWE 102 operation can be a game of chance as a gambling game running every 10 seconds where the amount wagered is communicated from the GWE 112 as a function of choices the player makes in the operation profile in the entertainment game such as those cited above.

In many embodiments, an autonomous agent hybrid game integrates a video game style gambling machine, where the gambling game (including an RWE 102 and RWC) is not player skill based, while at the same time allows players to use their skills to earn club points which a casino operator can translate to rewards, tournament opportunities and prizes for the players. The actual exchange of monetary funds earned or lost directly from gambling against a game of chance in a gambling game, such as a slot machine, is preserved. At the same time a rich environment of rewards to stimulate gamers can be established with the entertainment game. In several embodiments, the autonomous agent hybrid game can leverage very popular titles with gamers and provides a sea change environment for casinos to attract players with games that are more akin to the type of entertainment that a younger generation desires. In various embodiments, players can use their skill towards building and banking GWC that in turn can be used to win tournaments and various prizes as a function of their gamer prowess. Numerous embodiments minimize the underlying changes needed to the aforementioned entertainment software for the hybrid game to operate within an entertainment game construct, thus making a plethora of complex game titles and environments, rapid and inexpensive to deploy in a gambling environment.

In certain embodiments, autonomous agent hybrid games also allow players to gain entry into subsequent competitions through the accumulation of game world credits (GWC) as a function of the user's demonstrated skill at the game. These competitions can pit individual players or groups of players against one another and/or against the casino to win prizes based upon a combination of chance and skill. These competitions can be either asynchronous events, whereby players participate at a time and/or place of their choosing, or they can be synchronized events, whereby players participate at a specific time and/or venue.

In many embodiments, one or more players engage in playing an entertainment game, resident in the ESE, the outcomes of which are dependent at least in part on skill. The autonomous agent hybrid game can include an entertainment game that includes head to head play between a single player and the computer, between two or more players against one another, or multiple players playing against the computer and/or each other, as well as the process by which players bet on the outcome of the entertainment game. The entertainment game can also be a game where the player is not playing against the computer or any other player, such as in games where the player is effectively playing against himself or herself (such as but not limited to Solitaire and Babette).

Figure 2:
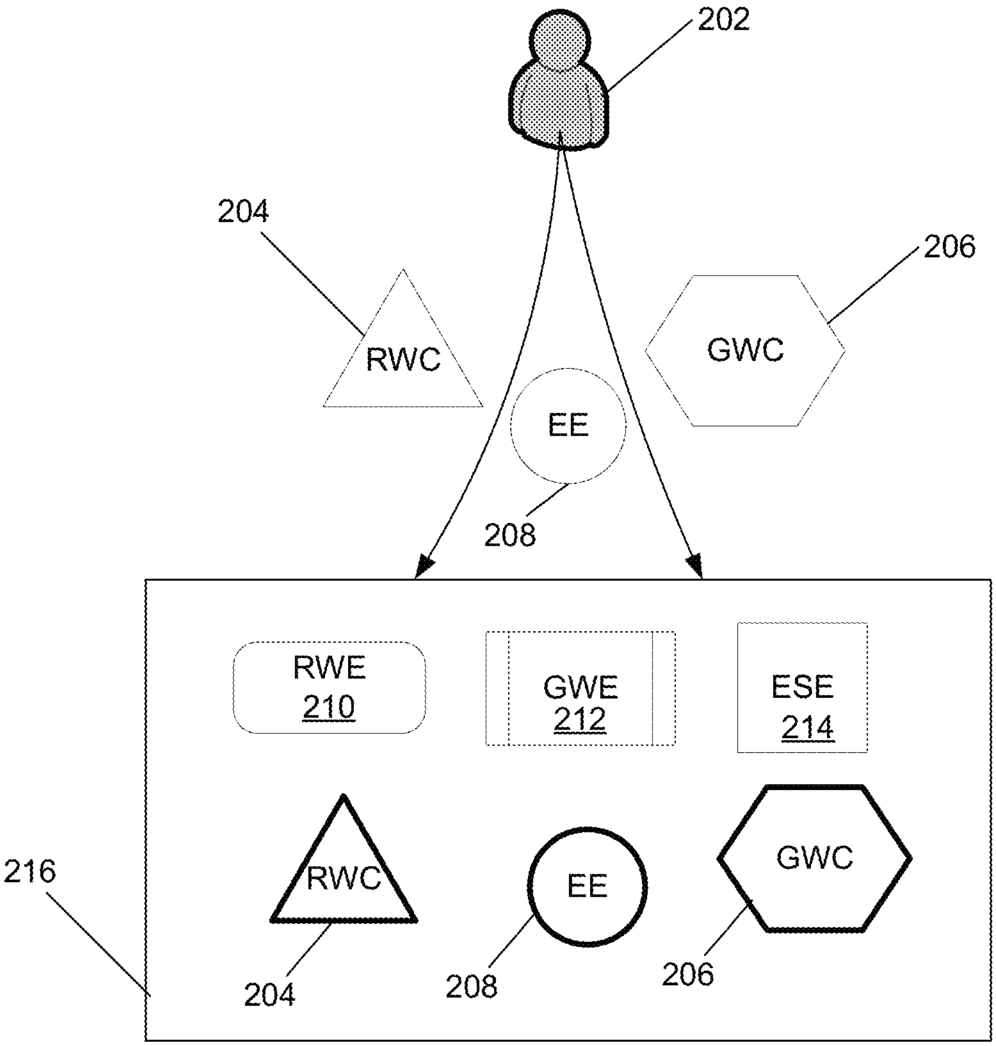
FIG. 2 is a conceptual diagram that illustrates how resources are utilized in an autonomous agent hybrid game in accordance with an embodiment of the invention.

In several embodiments, a player can interact with an autonomous agent hybrid game by using RWC in interactions with a gambling game along with GWC and elements in interactions with an entertainment game. The gambling game can be executed by a RWE while an entertainment game can be executed with an ESE and managed with a GWE. A conceptual diagram that illustrates how resources such as GWC, RWC and elements, such as but not limited to EE, are utilized in an autonomous agent hybrid game in accordance with an embodiment of the invention is illustrated in FIG. 2. The conceptual diagram illustrates that RWC 204, EE 208 and GWC 206 can be utilized by a player 202 in interactions with the RWE 210, GWE 212 and ESE 214 of an autonomous agent hybrid game 216. The contribution of elements, such as EE 208, can be linked to a player's access to credits, such as RWC 204 or GWC 206. Electronic receipt of these credits can come via a smart card, voucher or other portable media, or as received over a network from a server. In certain implementations, these credits can be drawn on demand from a player profile located in a database locally on an autonomous agent hybrid game or in a remote server.

Figure 3:
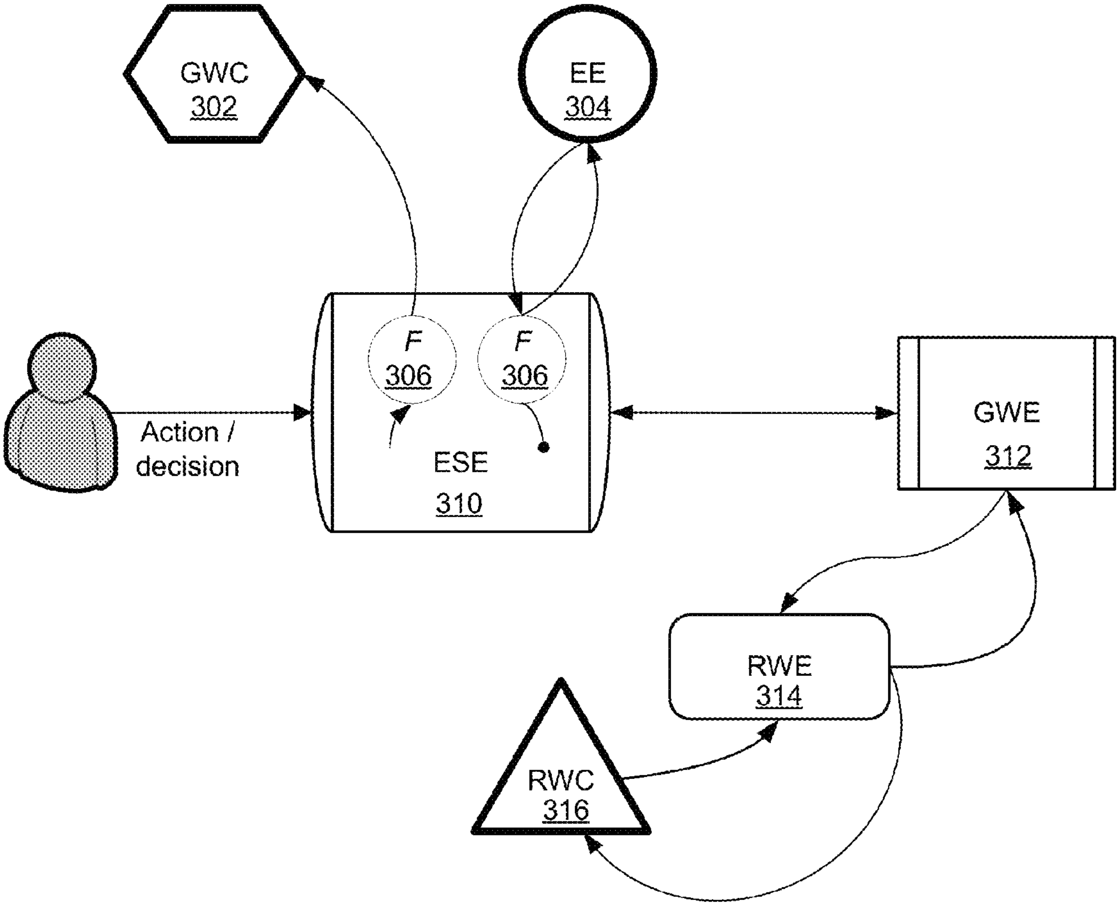
FIG. 3 is a conceptual diagram that illustrates interplay between resources and components of an autonomous agent hybrid game in accordance with an embodiment of the invention.

A conceptual diagram that illustrates interplay between elements and components of an autonomous agent hybrid game in accordance with an embodiment of the invention is illustrated in FIG. 3. Similar to FIG. 2, a player's actions and/or decisions can affect functions 306 that consume and/or accumulate GWC 302 and/or EE 304 in an entertainment game executed by an ESE 310. A GWE 312 can monitor the activities taking place within an entertainment game executed by an ESE 310 for gameplay gambling event occurrences. The GWE 312 can also communicate the gameplay gambling event occurrences to an RWE 314 that triggers a wager of RWC 316 in a gambling game executed by the RWE 314.

Figure 4:
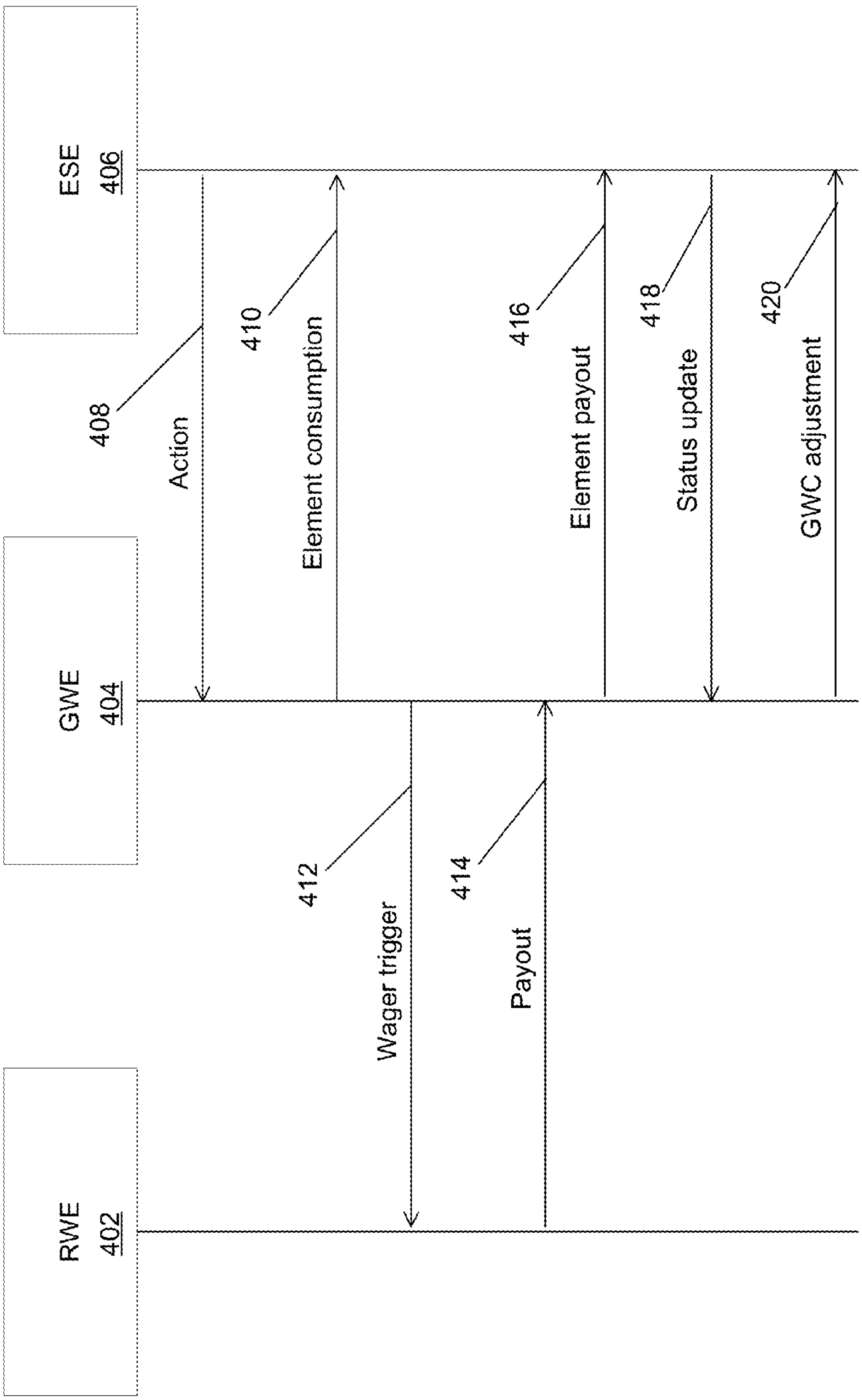
FIG. 4 is a timing diagram that illustrates a process of facilitating interactions between an entertainment game and a gambling game in accordance with embodiments of the invention.

A timing diagram that illustrates a process of facilitating interactions between an entertainment game and a gambling game in accordance with embodiments of the invention is illustrated in FIG. 4. The process includes a player performing a player action using a user interface. An ESE 406 can signal (408) a GWE 404 of the player action. The GWE 404 can signal (410) the ESE 406 as to the amount of EE that will be consumed by the player action in return. The signal can configure a function that controls EE consumption, decay or addition for the ESE. The ESE 406 can, based upon the function, consume an amount of EE designated by the GWE 404 to couple to the activity. Upon detection that the player action is a gameplay gambling event, the GWE 404 can signal an RWE 402 as to the wager terms associated with the gameplay gambling event triggers (412) a wager. The RWE 402 can consume RWC in executing the wager. The RWE 402 can return RWC as a payout from the wager. The RWE 402 can inform (414) the GWE 404 as to the payout from the wager. The GWE 404 can signal (416) the ESE 406 to ascribe a payout of EE based upon the wager. The ESE 406 can reconcile and combine the payout of EE with the EE already ascribed to the player in the entertainment game. The ESE 406 can signal (408) the GWE 404 as to its updated status based upon reconciling the payout of EE, and the GWE 404 can signal the ESE 406 of a payout of GWC in response (420) to the status update.

In some embodiments, the gambling wager may be triggered by a player's or autonomous agent's use of various elements within the entertainment game. These elements include, but are not limited to, enabling elements (EE) which are elements that enable a player's play of the entertainment game and whose consumption by the player while playing the entertainment game can trigger a wager in a gambling game. Another example of an element is a reserve enabling element (REE), which is an element that converts into one or more enabling elements upon occurrence of a release event in an autonomous agent hybrid game gameplay. Other types of elements include actionable elements (AE) which are elements that are acted upon to trigger a wager in the gambling game and cannot be restorable during normal play of the entertainment game. In progressing through entertainment game gameplay, elements can be utilized by a player or autonomous agent during interactions with a controlled entity (CE) which is a character, entity, inanimate object, device or other object under control of a player. Also, entertainment game gameplay progress can be dependent upon: a required object (RO) which is a specific object in an entertainment game acted upon for an AE to be completed (such as but not limited to a specific key needed to open a door); a required environmental condition (REC) which is a game state present within an entertainment game for an AE to be completed (such as but not limited to daylight whose presence enables a character to walk through woods); or a controlled entity characteristic (CEC) which is a status of the CE within an entertainment game for an AE to be completed (such as but not limited to a CE to have full health points before entering battle). Although various gameplay resources, such as but not limited to GWC, RWC and elements are discussed above, any gameplay resource can be utilized to advance autonomous agent hybrid game gameplay as appropriate to the specification of a specific application in accordance with embodiments of the invention.

In some embodiments, the consumption of the element may occur in the ESE without intermediation by the GWE. In other embodiments, the element is not consumed during entertainment game play but may be used to trigger a wager repeatedly.

In certain embodiments, the sequence of events in the timing diagram of FIG. 4 can be reflected in a first person shooter themed entertainment game. For example, a player can select a machine gun to use in an entertainment game and fires a burst at an opponent. The ESE can signal (408) the GWE of the player action, such as the player's choice of weapon, that a burst of fire was fired, and the outcome of whether the player hit the opponent with the burst of fire. The GWE can process the information concerning the machine gun burst, and signal (410) the ESE to consume 3 bullets (EE) with each pull of the trigger. The entertainment game then will consume 3 bullets (EE) based upon the trigger being pulled. The GWE can also signal (412) the RWE that 3 credits of RWC are to be wagered to match the 3 bullets (EE) consumed, on a particular pay table (Table Ln-RC) as a function how much damage the player inflicted on his/her opponent. The RWE can consume the 3 credits for the wager and execute the specified wager. In executing the wager, the RWE can determine that the player hits a jackpot of 6 credits, and return the 6 credits of RWC to the credit meter. The RWE can also inform (414) the GWE that 3 credits of RWC net were won as a payout from the wager. The GWE can signal (416) the ESE to add 3 bullets (EE) to the player's ammunition clip based upon the gambling game payout. The ESE can then add 3 bullets (EE) to the player's ammunition clip in the entertainment game. This can take place by directly adding them to the clip, or can happen in the context of the entertainment game, such as the player finding extra ammunition on the ground or in an old abandoned ammunition dump. The GWE can receive (418) an update from the ESE as to the total amount of EE associated with the player. The GWE can log the new player score (GWC) in the game (as a function of the successful hit on the opponent) based on the update, and signal (420) the ESE to add 2 extra points of GWC to the player's score.

Figure 5A:
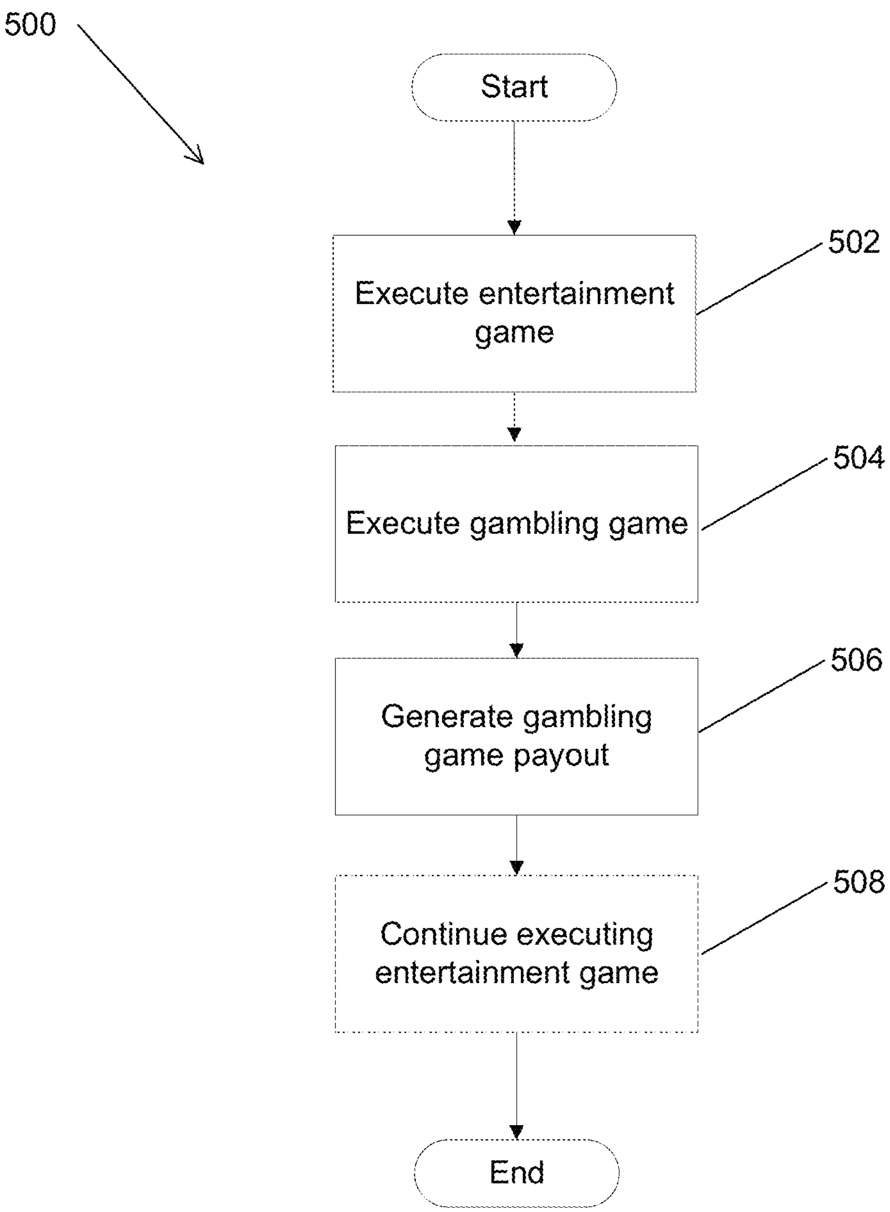
FIG. 5A illustrates a flow chart of a process for autonomous agent hybrid game gameplay utilizing resources in accordance with embodiments of the invention.

A process for utilizing resources within an autonomous agent hybrid game during gameplay in accordance with embodiments of the invention is illustrated in FIG. 5A. The process 500 includes executing (502) an entertainment game, which in turn can trigger the execution (504) of a gambling game. The gambling game can generate (506) a payout of RWCs due to a wager made within the gambling game. Optionally, the entertainment game can continue (508) to execute during and/or after the execution of the gambling game and/or the payout from wagers made during the gambling game.

Figure 5B:
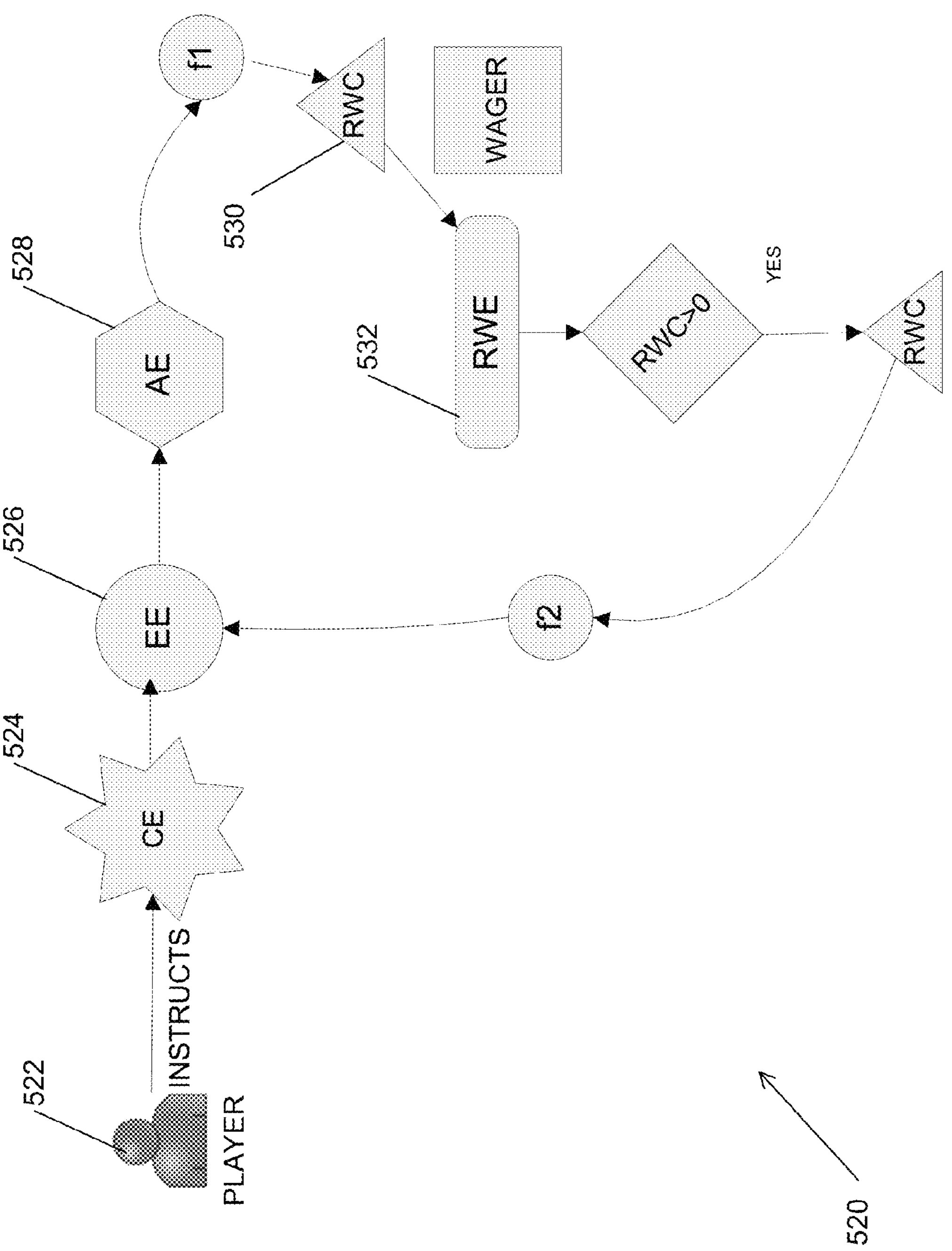
FIG. 5B illustrates a conceptual diagram that illustrates utilization of resources through a controlled entity in the process illustrated in FIG. 5A in accordance with an embodiment of the invention.
Figure 5C:
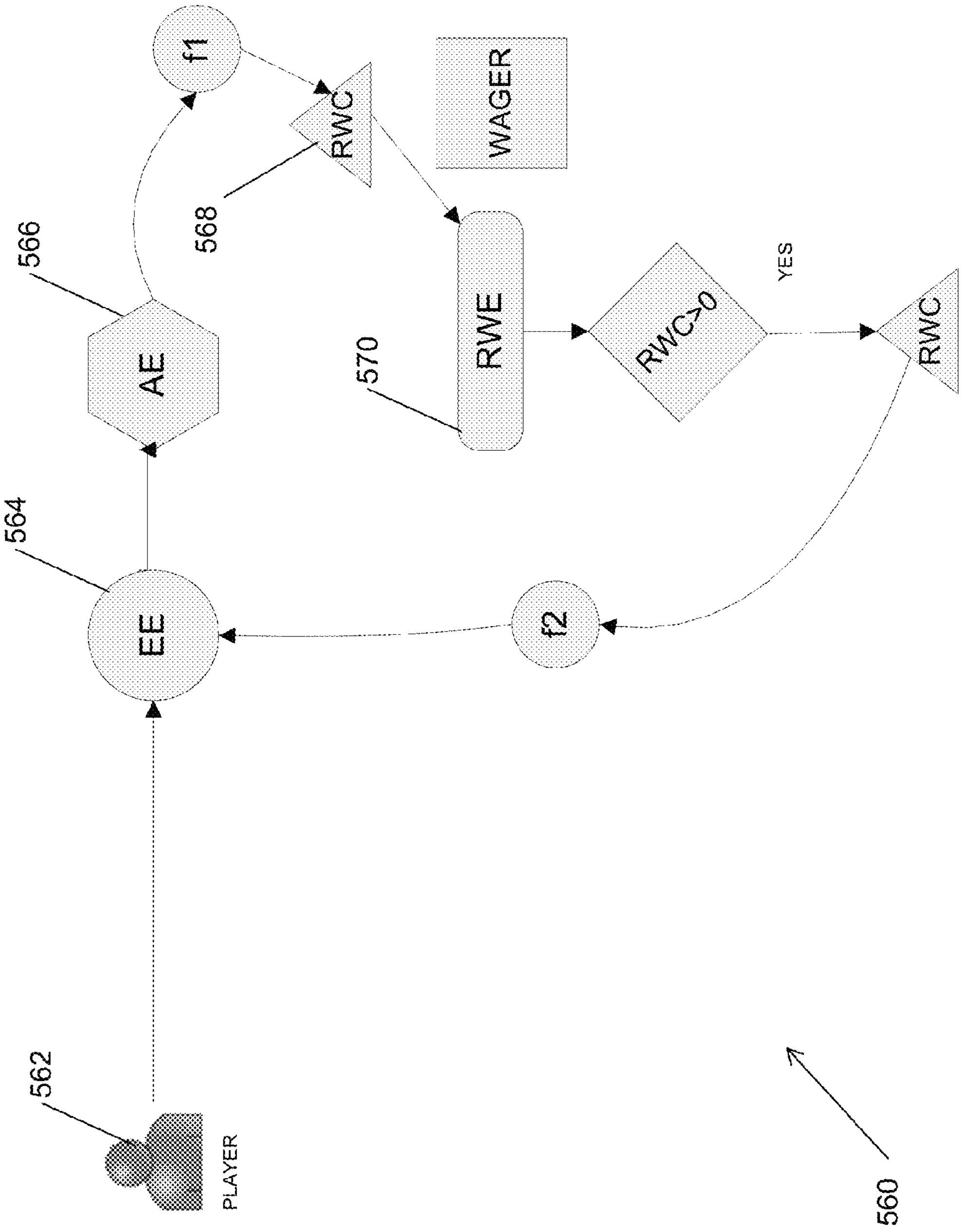
FIG. 5C illustrates a conceptual diagram that illustrates utilization of resources in the process illustrated in FIG. 5A in accordance with an embodiment of the invention.

A conceptual diagram that illustrates utilization of resources through a controlled entity (CE) in the process illustrated in FIG. 5A in accordance with an embodiment of the invention is illustrated in FIG. 5B. The diagram 520 illustrates that a player 522 can instruct a CE 524 to utilize EE 526 to act upon an AE 528 in an entertainment game. Action upon an AE 528 can trigger a gambling game in which RWC 530 is utilized in a RWE 532 within at least one wager. When a gambling game session is completed, a determination is made as to whether there is any RWC 314 left within the gambling game session, which is paid out and/or used to reallocate the EE 506 available to the CE in the entertainment game. A conceptual diagram that illustrates utilization of resources in the process illustrated in FIG. 5A directly without a CE in accordance with an embodiment of the invention is illustrated in FIG. 5C. The diagram 560 illustrates that a player 562 can directly utilize EE 564 to act upon an AE 566 in an entertainment game. Similar to FIG. 5B, action upon an AE 566 can trigger a gambling game in which RWC 572 is utilized in a RWE 570 within at least one wager. When a gambling game session is completed, a determination is made as to whether there is any RWC 568 left within the gambling game session, which is paid out and/or used to reallocate the EE 564 available to the player in the entertainment game.

In many embodiments, if an entertainment game employs an American football themed entertainment game, a player can bet on whether or not the player will beat another player. These bets can be made, for example, on the final outcome of the game, and/or the state of the game along various intermediary points (such as but not limited to the score at the end of the 1st quarter) and/or on various measures associated with the game (such as but not limited to the total offensive yards, number of turnovers, or number of sacks). Players can bet against one another, or engage the computer in a head to head competition in the context of their skill level in the entertainment game in question. As such, players can have a handicap associated with their player profile that describes their skill (which can be their professed skill in certain embodiments), and which is used by a GWE (such as a local GWE or a GWE that receives services from remote servers) to offer appropriate bets around the final and/or intermediate outcomes of the entertainment game, and/or to condition sponsored gameplay as a function of player skill, and/or to select players across one or more autonomous agent hybrid games to participate in head to head games and/or tournaments.

Many embodiments enable the maximization of the number of players able to compete competitively by enabling handicapping of players by utilizing a skill normalization module that handicaps players to even the skill level of players competing against each other. Handicapping enables players of varying performance potential to compete competitively regardless of absolute skill level, such as but not limited to where a player whose skill level identifies the player as a beginner can compete in head to head or tournament play against a highly skilled player with meaningful results.

In several embodiments, wagers can be made among numerous autonomous agent hybrid games with a global betting manager (GBM). The GBM is a system that coordinates wagers that are made across multiple autonomous agent hybrid games by multiple players. In some implementations it can also support wagers by third parties relative to the in game performance of other players. The GBM can stand alone, or is capable of being embedded in one of a number of systems, including a GWE, ESE or any remote server capable of providing services to an autonomous agent hybrid game, or can operate independently on one or a number of servers on-site at a casino, as part of a larger network and/or the Internet or cloud in general. The GBM also supports the management of lottery tickets issued as a function of sponsored gameplay.

Although various components of autonomous agent hybrid games are discussed above, autonomous agent hybrid games can be configured with any component as appropriate to the specification of a specific application in accordance with embodiments of the invention. In certain embodiments, components of an autonomous agent hybrid game, such as a GWE, RWE, ESE can be configured in different ways for a specific autonomous agent hybrid game gameplay application. Network connected autonomous agent hybrid games are discussed below.

Network Connected Autonomous Agent Hybrid Games

Autonomous agent hybrid games in accordance with many embodiments of the invention can operate locally while being network connected to draw services from remote locations or to communicate with other autonomous agent hybrid games. In many embodiments, operations associated with an autonomous agent hybrid game utilizing an agency module can be performed across multiple devices. These multiple devices can be implemented using a single server or a plurality of servers such that an autonomous agent hybrid game is executed as a system in a virtualized space, such as (but not limited to) where the RWE and GWE are large scale centralized servers in the cloud coupled to a plurality of widely distributed ESE controllers or clients via the Internet.

In many embodiments, an RWE server can perform certain functionalities of a RWE of an autonomous agent hybrid game. In certain embodiments, a RWE server includes a centralized odds engine which can generate random outcomes (such as but not limited to win/loss outcomes) for a gambling game. The RWE server can perform a number of simultaneous or pseudo-simultaneous runs in order to generate random outcomes for a variety of odds percentages that one or more networked autonomous agent hybrid games can use. In certain embodiments, an RWE of an autonomous agent hybrid game can send information to a RWE server including (but not limited to) Table Ln-RWC tables, maximum speed of play for a gambling game, gambling game monetary denominations or any promotional RWC provided by the operator of the autonomous agent hybrid game. In particular embodiments, a RWE server can send information to a RWE of an autonomous agent hybrid game including (but not limited to) RWC used in the gambling game, player profile information or play activity and a profile associated with a player.

In several embodiments, a GWE server can perform the functionality of the GWE across various autonomous agent hybrid games. These functionalities can include (but are not limited to) providing a method for monitoring high scores on select groups of games, coordinating interactions between gameplay layers, linking groups of games in order to join them in head to head tournaments, and acting as a tournament manager.

In a variety of embodiments, management of player profile information can be performed by a patron management server separate from a GWE server. A patron management server can manage information related to a player profile, including (but not limited to) data concerning controlled entities (such as characters used by a player in entertainment game gameplay), game scores, elements, RWC and GWC associated with particular players and managing tournament reservations. Although a patron management server is discussed separate from a GWE server, in certain embodiments a GWE server also performs the functions of a patron management server. In certain embodiments, a GWE of an autonomous agent hybrid game can send information to a patron management server including (but not limited to) GWC and RWC used in a game, player profile information, play activity and profile information for players and synchronization information between a gambling game and an entertainment game or other aspects of an autonomous agent hybrid game. In particular embodiments, a patron management server can send information to a GWE of an autonomous agent hybrid game including (but not limited to) entertainment game title and type, tournament information, Table Ln-GWC tables, special offers, character or profile setup and synchronization information between a gambling game and an entertainment game or other aspects of an autonomous agent hybrid game.

In numerous embodiments, an ESE server provides a host for managing head to head play, operating on the network of ESEs which are connected to the ESE server by providing an environment where players can compete directly with one another and interact with other players. Although an ESE server is discussed separate from a GWE server, in certain embodiments a GWE server also performs the functions of an ESE server.

In several embodiments, an agency server can be connected with an autonomous agent hybrid game and can implement an agency module to coordinate the activities of an autonomous agent hybrid game. An agency module can execute as part of an agency server to allocate a gambling game agent wager payout resulting from at least one agent player action generated from an agent player profile configured by a player of the autonomous agent hybrid game.

Servers connected via a network to implement autonomous agent hybrid games in accordance with many embodiments of the invention can communicate with each other to provide services utilized within an autonomous agent hybrid game. In several embodiments a RWE server can communicate with a GWE server. A RWE server can communicate with a GWE server to communicate any type of information as appropriate for a specific application, including (but not limited to): information used to configure the various simultaneous or pseudo simultaneous odds engines executing in parallel within the RWE to accomplish autonomous agent hybrid game system functionalities, information used to determine metrics of RWE performance such as random executions run and outcomes for tracking system performance, information used to perform audits, provide operator reports, and information used to request the results of a random run win/loss result for use of function operating within the GWE (such as where automatic drawings for prizes are a function of ESE performance).

In several embodiments a GWE server can communicate with an ESE server. A GWE server can communicate with an ESE server to communicate any type of information as appropriate for a specific application, including (but not limited to): the management of an ESE server by a GWE server during an autonomous agent hybrid game tournament. Typically a GWE (such as a GWE that runs within an autonomous agent hybrid game or on a GWE server) is not aware of the relationship of itself to the rest of a tournament since in a typical configuration the actual tournament play is managed by the ESE server. Therefore, management of an autonomous agent hybrid game tournament can include (but is not limited to) tasks such as: conducting tournaments according to system programming that can be coordinated by an operator of the autonomous agent hybrid game; allowing entry of a particular player into a tournament; communicating the number of players in a tournament and the status of the tournament (such as but not limited to the amount of surviving players, their status within the game, time remaining on the tournament); communicating the performance of its players within the tournament; communicating the scores of the various members in the tournament; and providing a synchronizing link to connect the GWEs in a tournament with their respective ESE's.

In several embodiments a GWE server can communicate with a patron management server. A GWE server can communicate with a patron management server to communicate any type of information as appropriate for a specific application, including (but not limited to) information for configuring tournaments according to system programming conducted by an operator of an autonomous agent hybrid game, information for exchange of data used to link a player's player profile to their ability to participate in various forms of sponsored gameplay (such as but not limited to the difficulty of play set by the GWE server or the GWE), information for determining a player's ability to participate in a tournament as a function of a player's characteristics (such as but not limited to a player's gaming prowess or other metrics used for tournament screening), information for configuring GWE and ESE performance to suit preferences of a player on a particular autonomous agent hybrid game, information for determining a player's play and gambling performance for the purposes of marketing intelligence, and information for logging secondary drawing awards, tournament prizes, RWC and GWC into the player profile.

In many embodiments, the actual location of where various algorithms and functions are executed can be located either in the game contained devices (RWE, GWE, ESE), on the servers (RWE server, GWE server, or ESE server), or a combination of both game contained devices and servers. In particular embodiments, certain functions of a RWE server, GWE server, patron management server or ESE server can operate on the local RWE, GWE or ESE contained with an autonomous agent hybrid game locally. In certain embodiments, a server is a server system including a plurality of servers, where software can be run on one or more physical devices. Similarly, in particular embodiments, multiple servers can be combined on a single physical device.

Figure 6:
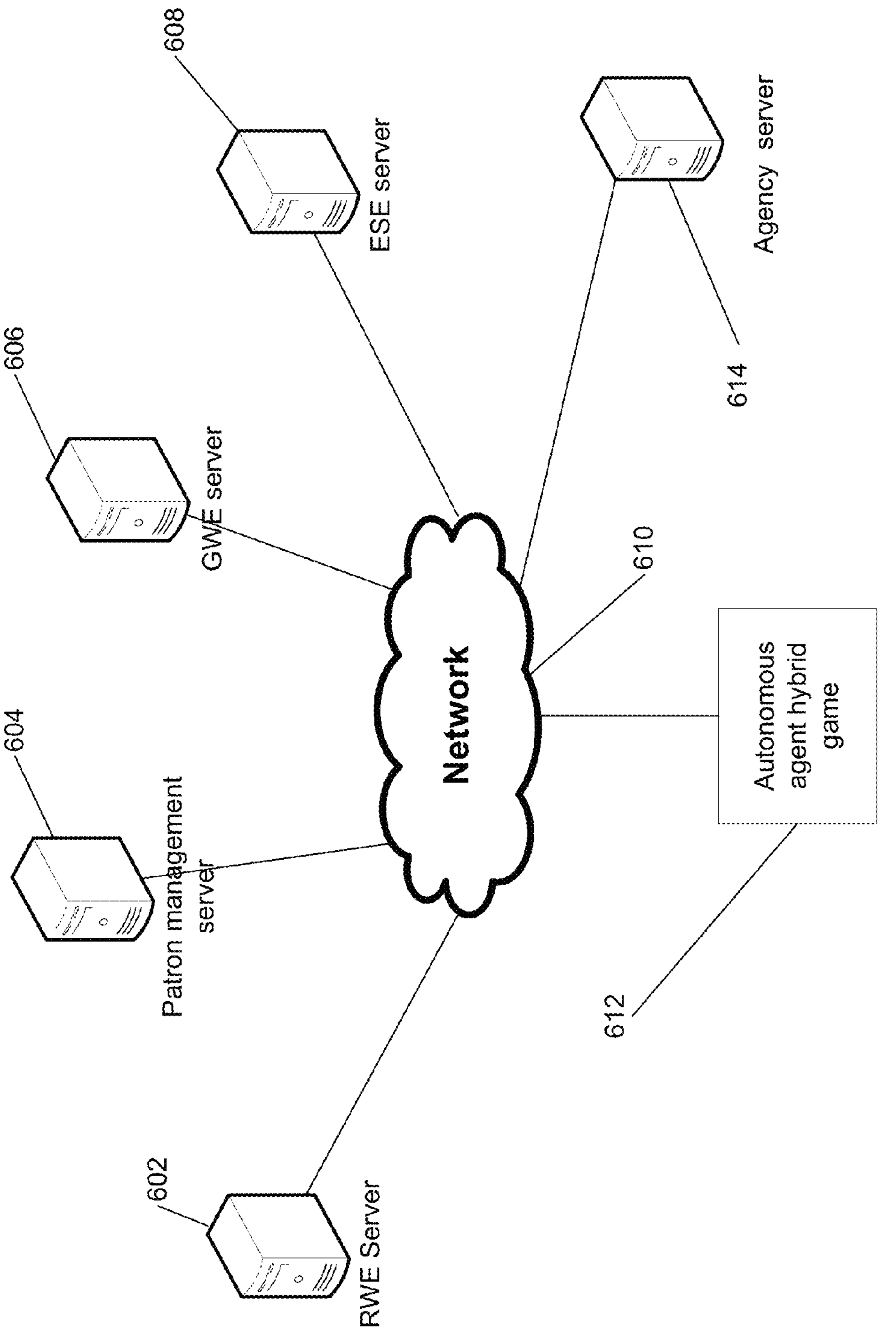
FIG. 6 is a system diagram that illustrates a network distributed autonomous agent hybrid game in accordance with an embodiment of the invention.

Autonomous agent hybrid games in accordance with many embodiments of the invention can be networked with remote servers in various configurations. A networked autonomous agent hybrid game in accordance with an embodiment of the invention is illustrated in FIG. 6. The networked autonomous agent hybrid game 612 is connected with a RWE server 602, patron management server 604, GWE server 606, ESE server 608 and an agency server 614 over a network 610, such as (but not limited to) the Internet. Servers networked with a networked autonomous agent hybrid game 612 can also communicate with each of the components of a networked autonomous agent hybrid game and amongst the other servers in communication with the networked autonomous agent hybrid game 612.

Figure 7:
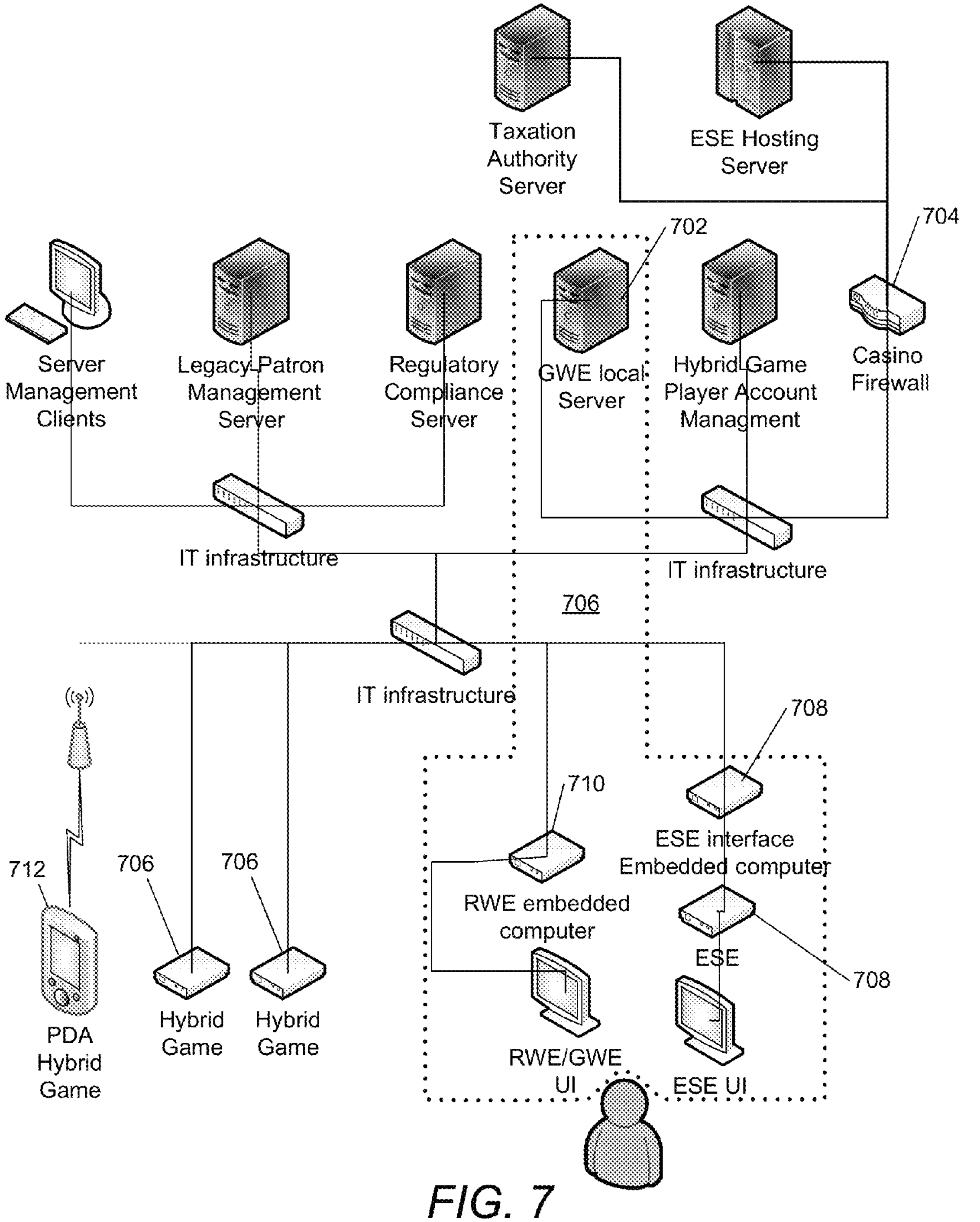
FIG. 7 is a system diagram that illustrates an implementation of a network distributed autonomous agent hybrid game including a game world engine local server in accordance with an embodiment of the invention.

A system diagram that illustrates an implementation of a network distributed autonomous agent hybrid game with a GWE local server in accordance with an embodiment of the invention is illustrated in FIG. 7. The system includes several autonomous agent hybrid games 706 sharing services from the same GWE local server 702 over a network. The several autonomous agent hybrid games can be implemented on any device, including laptops, desktop computers, mobile phones, tablets or a wireless personal digital assistant 712 (PDA) over a wireless connection. A single autonomous agent hybrid game 706 with a RWE 710, ESE 708 and GWE 702 is enclosed within a dotted line. A number of other peripheral systems, such as player management, casino management, regulatory, and hosting servers can also interface with the autonomous agent hybrid games over a network within an operator's firewall 704. Also, other servers can reside outside the bounds of a network within an operator's firewall 704 to provide additional services for network connected autonomous agent hybrid games.

Figure 8:
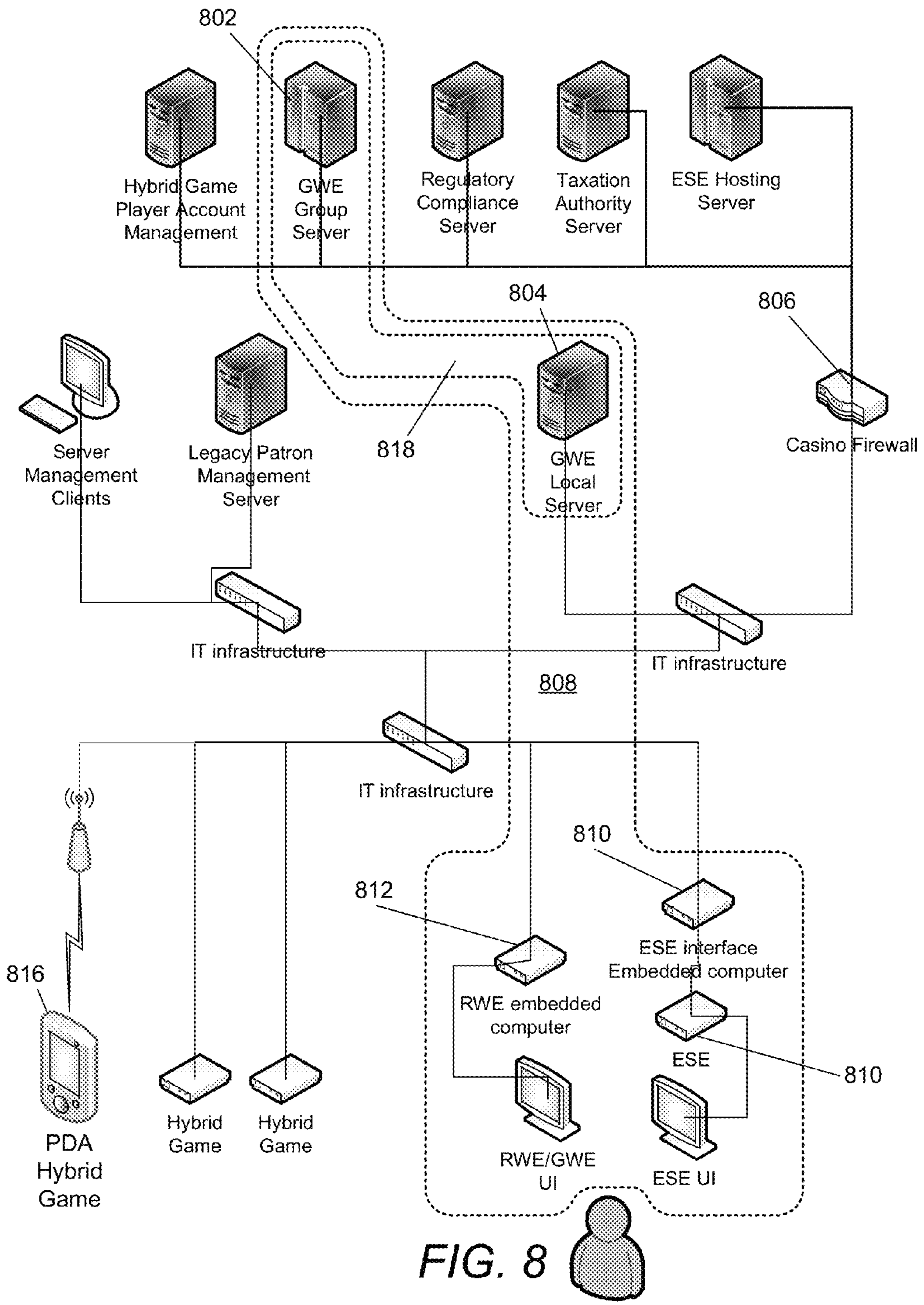
FIG. 8 is a system diagram that illustrates an implementation of a network distributed hybrid game including a game world engine group server in accordance with an embodiment of the invention.

A system diagram that illustrates an implementation of a network distributed hybrid game with a GWE local server and a GWE group server in accordance with an embodiment of the invention is illustrated in FIG. 8. This system includes an autonomous agent hybrid game with a RWE 812, ESE 810 and GWE local server 804 enclosed within a dotted line but where a single hybrid game can call upon services from servers within an operator's firewall 806 (such as but not limited to a GWE local server) as well as beyond an operator's firewall 806 (such but not limited to a GWE group server 802). The GWE group server 802 can coordinate multiple autonomous agent hybrid games from across a network that spans beyond an operator's firewall 806. A GWE server system 818 can include multiple GWE servers, such as but not limited to a GWE local server 804 and a GWE group server 802. Multiple network connected hybrid games can implemented using various computing devices (such as but not limited to laptops, desktop computers, mobile phones, tablets or a wireless PDA 816) and be connected to various servers to call upon services that enable the execution of the hybrid game.

Figure 9:
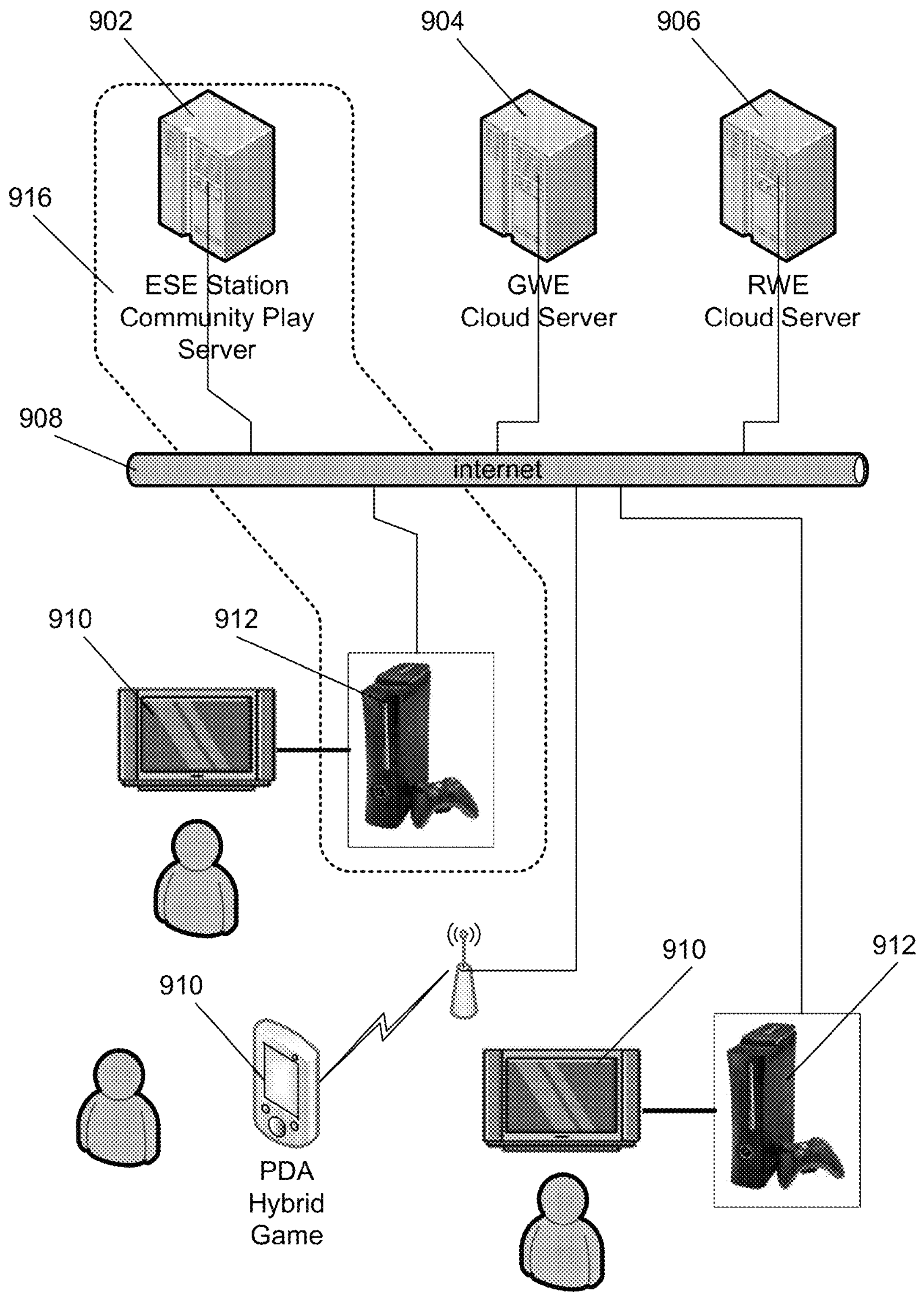
FIG. 9 is a system diagram that illustrates an implementation of an Internet distributed hybrid game in accordance with an embodiment of the invention.

A system diagram that illustrates an implementation of network distributed hybrid games over the Internet in accordance with an embodiment of the invention is illustrated in FIG. 9. The system includes an ESE server 902, GWE server 904 and RWE server 906 that connects to a user interface 910 (such as but not limited to a television screen, computer terminal, tablet, touchscreen or PDA) of autonomous agent hybrid games over the Internet 908. Each autonomous agent hybrid game includes a local ESE 912 that also interfaces with a remote ESE server 902. Processes performed by an ESE 916 services can be performed in multiple locations, such as but not limited to remotely on an ESE server 902 and locally on a local ESE 912.

Although various networked autonomous agent hybrid games are discussed above, autonomous agent hybrid games can be networked in any configuration as appropriate to the specification of a specific application in accordance with embodiments of the invention. In certain embodiments, components of a networked autonomous agent hybrid game, such as a GWE, RWE, ESE or servers that perform services for a GWE, RWE or ESE, can be networked in different configurations for a specific networked autonomous agent hybrid game gameplay application. Agency modules are discussed below.

Agency Modules

Agency modules in accordance with many embodiments of the invention enable autonomous agent hybrid game gameplay at a high-level of player gameplay abstraction where players indirectly experience a gameplay environment though autonomously functioning agents. In several embodiments, a player's gameplay interactions can span from a low-level of player gameplay abstraction to a high-level of player gameplay abstraction. A low-level of player gameplay abstraction describes player gameplay where the player is directly engaged in player gameplay, such as but not limited to by directly manipulating a gameplay environment. The player's interactions with a user interface (such as but not limited to buttons, touch screen, game controller, mock-rifle, or a keyboard) are communicated in near-real-time to the ESE and inform, direct and influence player actions within the entertainment game. An example of a low-level of player gameplay abstraction in certain embodiment can include a player pressed button on a user interface that fires a weapon in a shooter themed entertainment game.

In several embodiments, a mid-level player gameplay abstraction includes a player progressing through an entertainment game gameplay session using a CE. A CE can be an avatar within a game from which a player can interact with a gameplay environment. A player can use a CE by giving instructions directly through a CE, which the CE carries out. In several embodiments with an adventure themed entertainment game, a player can utilize a CE that plays the role of a thief. The player can control the CE and cause the CE to undertake certain actions, such as but not limited to attack another character, attempt to pick locks or to pick up items. A player can control the CE from a user interface such as by pressing a button when approaching a locked door, which can cause the CE to undergo a process of attempting to pick a lock. A player can generate a player instruction that directs a CE in a mid-level player gameplay abstraction (such as but not limited to directing a CE to pick a lock), which is interpreted in the context of an entertainment game gameplay environment (such as but not limited to standing in front of a locked door) and leads to the invocation of a player action performed by the CE. The invocation of the player action can include the consumption of elements and/or other gameplay resources. In various embodiments where multiple CEs are controlled in a football themed entertainment game, a player can select a play to be run, and then the player's CEs (such as but not limited to the offensive players on the field) can execute the player instruction.

In various embodiments, a high-level of player gameplay abstraction describes when a player is indirectly engaged in player gameplay by utilizing an agent. In contrast to a low-level or mid-level of player gameplay abstraction where a player can directly manipulate a gameplay environment or control a CE to manipulate a gameplay environment, a player does not directly control an agent during an entertainment game gameplay session to directly manipulate a gameplay environment when engaged at a high-level of player gameplay abstraction. In engaging in gameplay at a high-level of gameplay abstraction, a player can configure an agent that is released into an entertainment game gameplay session to autonomously progress through gameplay without direct, real time instruction from a player.

Figure 10:
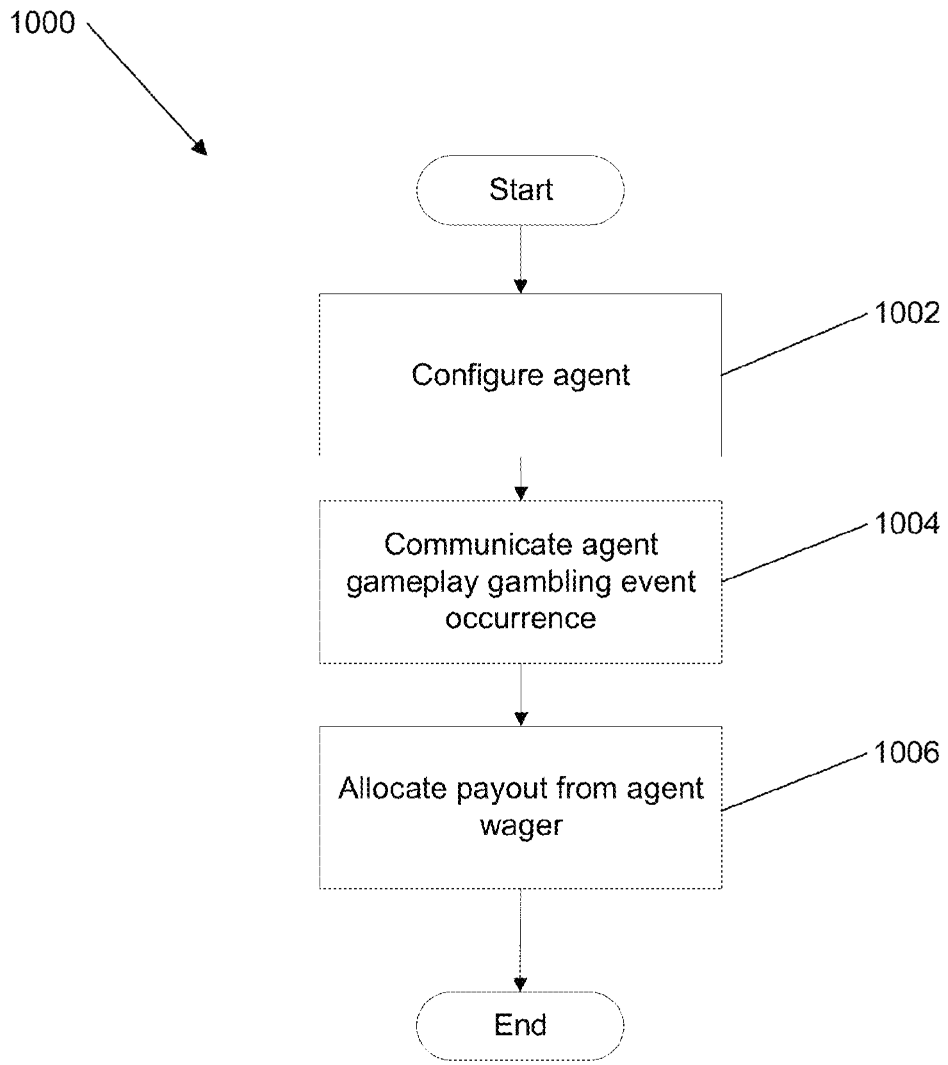
FIG. 10 illustrates a flow chart of a process of executing an autonomous agent hybrid game gameplay session in accordance with an embodiment of the invention.

An agency module in accordance with many embodiments of the invention is constructed to enable autonomous agent hybrid game gameplay at a high-level of player gameplay abstraction by allocating a gambling game agent wager payout resulting from at least one agent player action generated from an agent player profile configured by a player of the autonomous agent hybrid game. A flow chart of a process used by an agency module to execute an autonomous agent hybrid game gameplay session in accordance with an embodiment of the invention is illustrated in FIG. 10. The process 1000 includes configuring (1002) an agent by configuring the agent's agent player profile. During entertainment game gameplay, agent player actions can be generated using the agent player profile. The agent player actions can be interpreted as an agent gameplay gambling event occurrence that can be communicated (1004) to a RWE to trigger an agent wager. The agent wager can generate a payout that is allocated (1006) to the player that configured the agent. In certain embodiments, an agent wager payout can also include an addition of EE to an agent player profile based upon a payout of RWC as defined by an agent player profile.

Figure 11A:
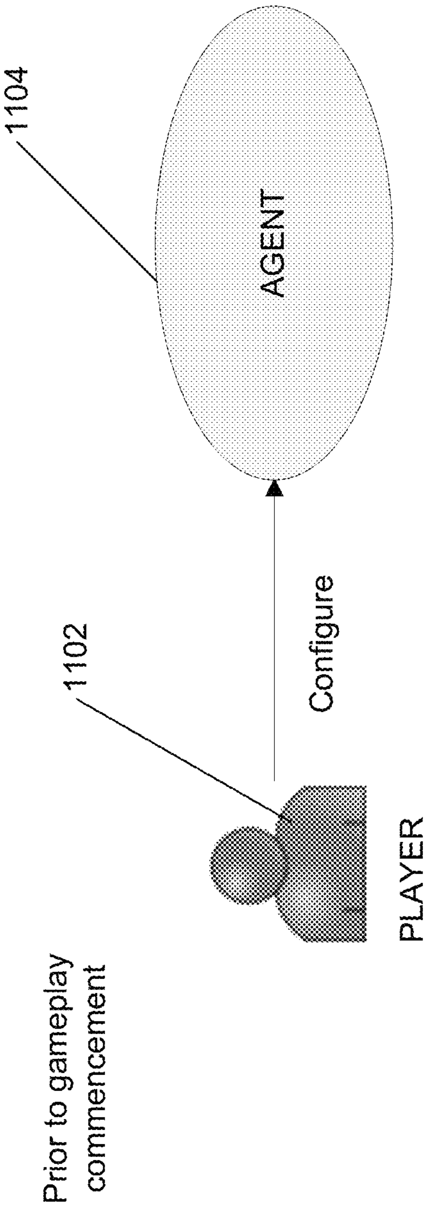
FIG. 11A is a conceptual diagram that illustrates a process for configuring an agent player profile prior to commencement of an entertainment game gameplay session in accordance with an embodiment of the invention.

A conceptual diagram that illustrates a process for configuring an agent player profile prior to commencement of an entertainment game gameplay session in accordance with an embodiment of the invention is illustrated in FIG. 11A. The conceptual diagram illustrates that a player 1102 can design an agent by configuring the agent player profile 1104 prior to the commencement of an entertainment game gameplay session. An agent player profile can be configured based upon instructions received via a user interface. These instructions can be generated by a player of the autonomous agent hybrid game. In certain embodiments, these instructions can be interpreted by an agent player profile configuration rule and mapped to a particular agent player profile configuration, such as but not limited to an instruction for changing the aggressiveness setting for an agent that configures the agent player profile to change the rate of occurrence for agent player actions. An agent player profile configuration rule can include any rule that configures any aspect of an agent player profile based upon player instructions received via a user interface including but not limited to: performance of agent player actions, gameplay resources available to an agent player during autonomous agent hybrid game gameplay, wager terms that govern an agent wager and definitions of an agent gameplay gambling event occurrence.

In many embodiments, an agent player profile configuration rule can place limits on how the agent player profile is configured. In certain embodiments, an agent player profile configuration rule can mandate that an allocation of RWC from a player profile to an agent player profile be made only once to place a total limit on a player's exposure to loss of RWC.

Figure 11B:
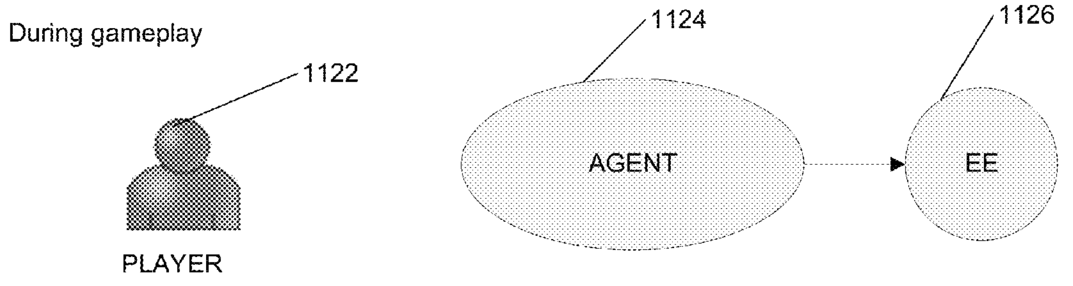
FIG. 11B is a conceptual diagram that illustrates a process for entering an entertainment game gameplay session with an agent in accordance with an embodiment of the invention.

In numerous embodiments, an agent's agent player profile can be configured by the gameplay environment of the autonomous agent hybrid game. An agent player profile can be configured by the gameplay environment of the autonomous agent hybrid game in any manner, such as but not limited to an agent player profile upgrading to higher experience levels based upon entertainment game gameplay accomplishments and from a loss or acquisition of various gameplay resources. These configurations to an agent player profile can also affect the configurations previously set by player instructions, such as but not limited to updating or negating previous configurations of the agent player profile. Furthermore, an agent player profile can be saved/and or associated with a player profile to be deployed on different autonomous agent hybrid games at and/or at different times. A conceptual diagram that illustrates a process for entering an entertainment game gameplay session with an agent in accordance with an embodiment of the invention is illustrated in FIG. 11B. The conceptual diagram illustrates that an agent 1124 can directly utilize EE 1126 during gameplay without player 1122 supervision.

Figure 11C:
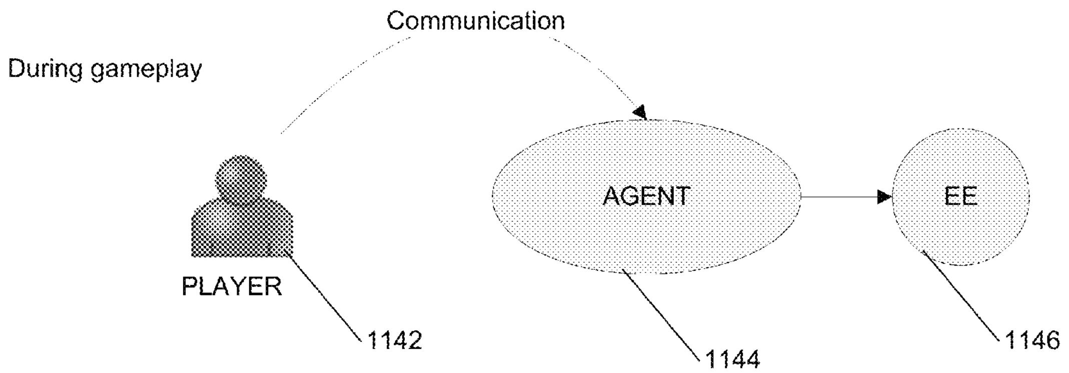
FIG. 11C is a conceptual diagram that illustrates a process for communicating with an agent during an entertainment game gameplay session in accordance with an embodiment of the invention.

In many embodiments, a player can interact with an agent after configuring an agent player profile after an entertainment game gameplay session begins. A player can interact with an agent in various ways, including but not limited to by interacting with an agent in a manner similar to an interaction with another player during an entertainment game gameplay session and to further configure the agent player profile. In certain embodiments, a player can further configure the agent player profile to address issues relating to an ongoing gameplay session, such as but not limited to causing the agent to exit or pause gameplay and to augment the gameplay resources associated with an agent player profile with depleted gameplay resources. The interaction can occur at any time, including but not limited to during an entertainment game gameplay session, prior to execution of an agent wager or after a particular agent player action has occurred. A conceptual diagram that illustrates a process for communicating with an agent during an entertainment game gameplay session in accordance with an embodiment of the invention is illustrated in FIG. 11C. The conceptual diagram illustrates that a player 1142 can communicate during an entertainment game gameplay session with an agent 1144 that can autonomously utilize EE 1146.

Figure 12:
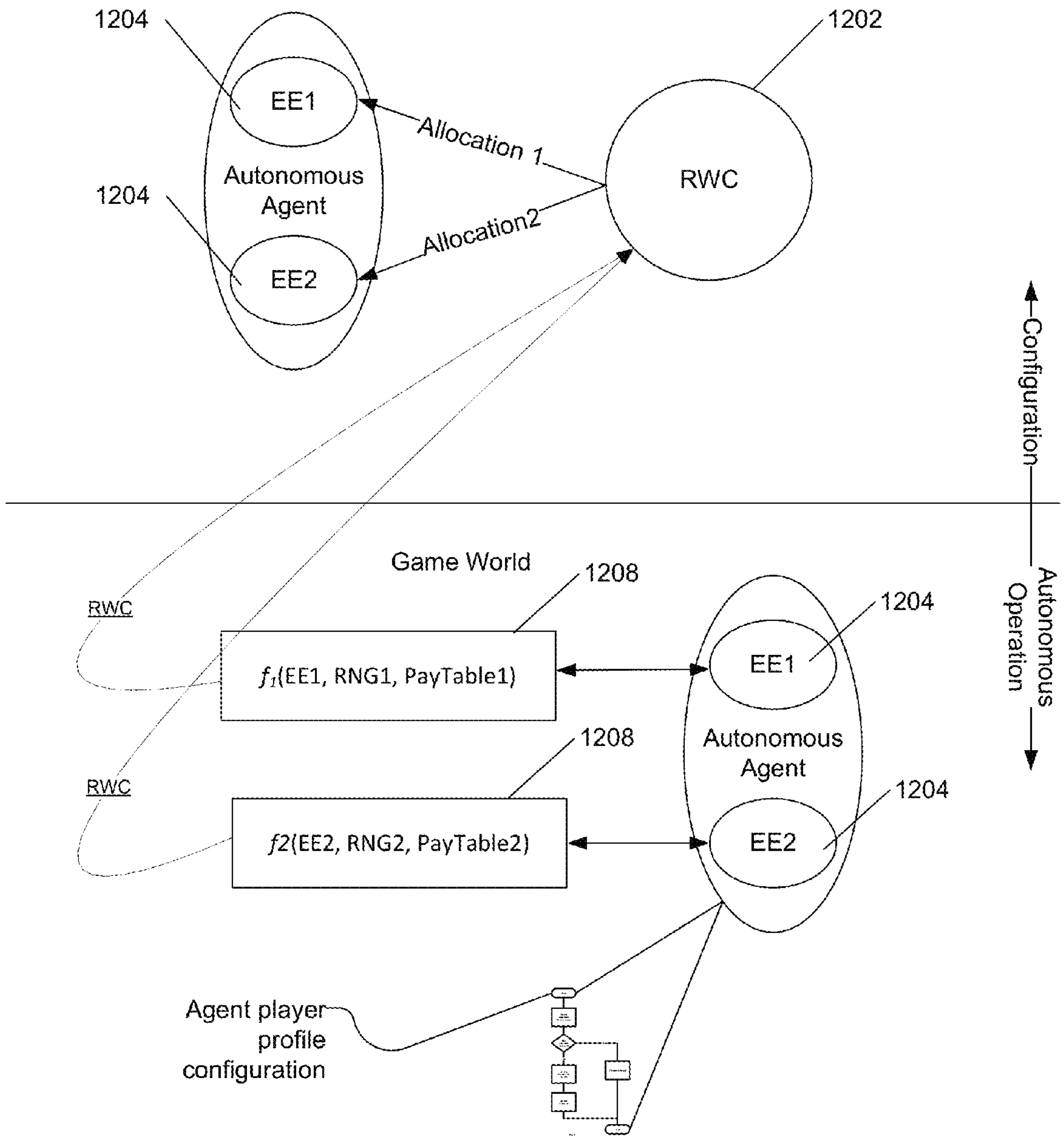
FIG. 12 is a conceptual diagram that illustrates how resources are allocated to an agent during an autonomous agent hybrid game gameplay session in accordance with an embodiment of the invention.

In various embodiments, an agent player profile can be configured with an allocation of RWC transferred to the agent player profile from a player profile associated with the player that configures the agent player profile. The agent can progress through gameplay in a manner prescribed by the configuration of the agent player profile and generate agent player actions used to trigger an agent wager. The agent wager can be made with wager terms set by the configuration of the agent player profile and the payout from the wager can be allocated to the player profile of the player that configured the agent player profile. A conceptual diagram that illustrates how resources are allocated to an agent during an autonomous agent hybrid game gameplay session in accordance with an embodiment of the invention is illustrated in FIG. 12. The conceptual diagram illustrates how RWC 1202 can be allocated from a player profile to the agent player profiles of several agents 1204. Along with the allocation of RWC, each agent player profile can be configured with particular wager terms dependent upon different agent gameplay gambling event occurrences. Upon occurrence of the different agent gameplay gambling event occurrences, an agent wager can be taken in a gambling game 1208 which can generate a payout of real world credits that are added to the RWC 1202 of the player profile that provided RWC to the agent player profiles. In several embodiments, the gambling game is not affected by the configuration of the agent player profiles as the RNG and pay tables are independent of entertainment game play.

Figure 13:
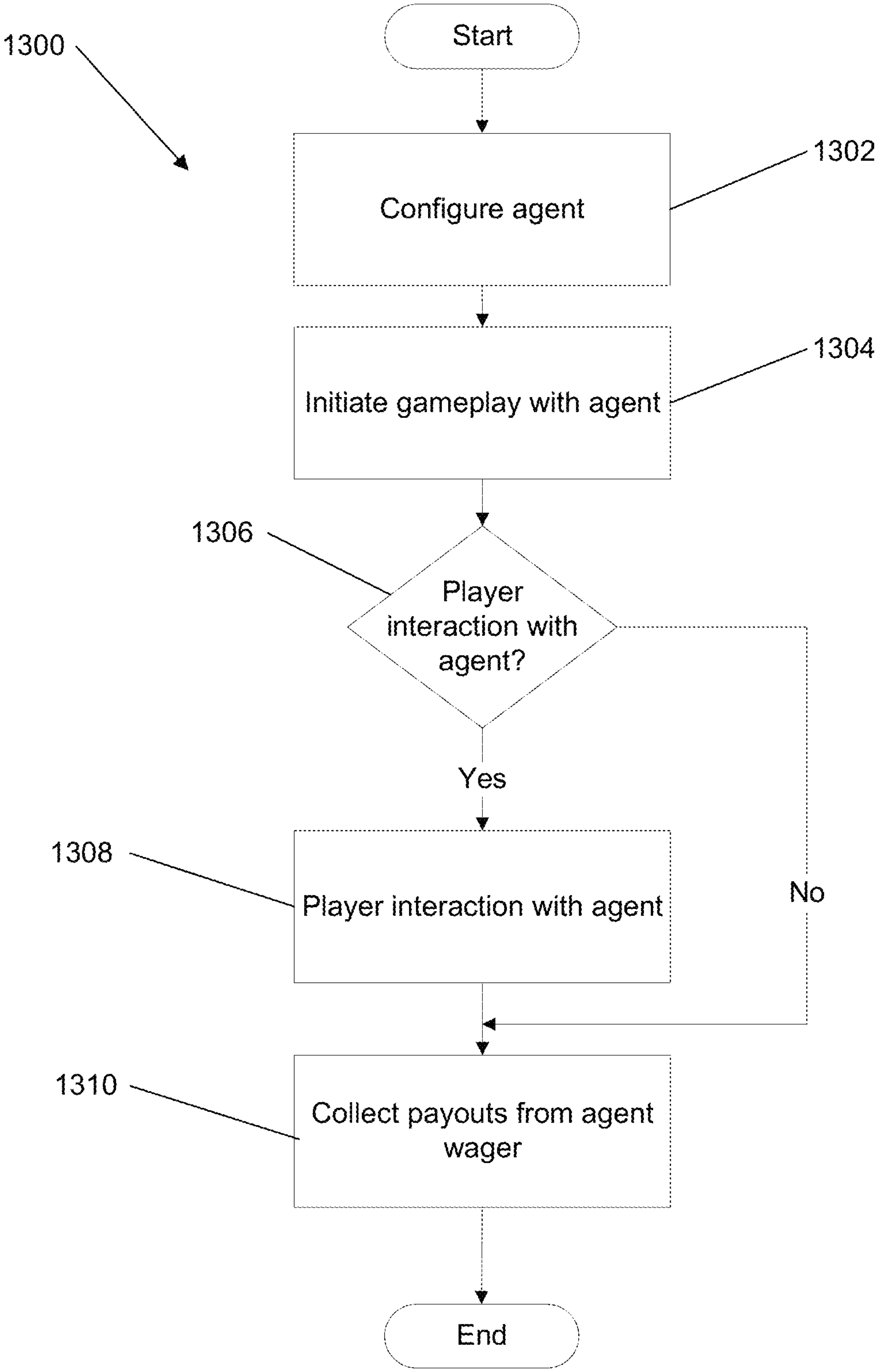
FIG. 13 illustrates a flow chart of a process for executing an autonomous agent hybrid game gameplay session in accordance with an embodiment of the invention.

A flow chart of a process for executing an autonomous agent hybrid game gameplay session in accordance with an embodiment of the invention is illustrated in FIG. 13. The process 1300 includes configuring (1302) an agent player profile. Entertainment game gameplay can be initiated (1304) with a configured agent player profile. A decision 1306 can be made as to whether a player can interact with an agent during entertainment game gameplay. If a player is to interact with an agent, then the interaction (1308) is made. If the player is not to interact with an agent, then an interaction is not made and autonomous agent hybrid game gameplay continues. During the course of autonomous agent hybrid game gameplay, agent player actions can be detected as agent gameplay gambling event occurrences to trigger an agent wager in a gambling game with the resultant payout from an agent wager collected (1310) by the player.

Figure 14:
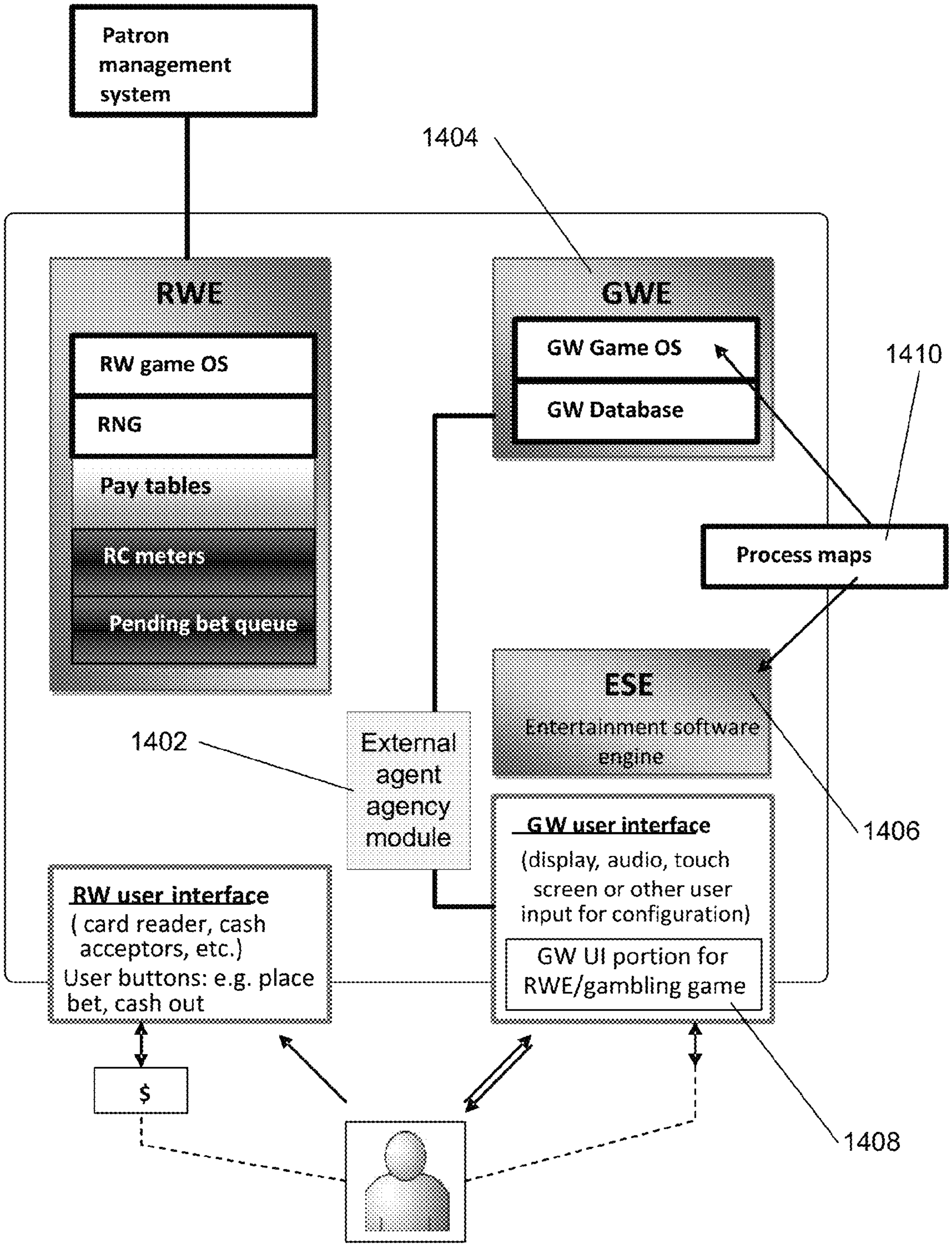
FIG. 14 is a conceptual diagram that illustrates how an agency module functions to implement an external agent in an autonomous agent hybrid game in accordance with an embodiment of the invention.

Agency modules in accordance with many embodiments of the invention can enable the implementation of an external agent that can assume a role that can be taken by a player in autonomous agent hybrid game gameplay and an internal agent that autonomously progresses through entertainment game gameplay without assuming a role that can be taken by a player. In several embodiments, an external agent can assume a role that can be taken by a player by utilizing an agent player profile that is configured to generate agent player actions of an agent in a role that can be taken by a player. The agent player profile can be configured utilizing historical player interactions with the autonomous agent hybrid game, such as by utilizing an agent player profile configuration rule that is a learning algorithm that configures the agent player profile to generate agent player actions that mimic historical player actions. Any type of learning algorithm can be utilized to configure a external agent's agent player profile including but not limed to supervised learning algorithms (such as but not limited to support vector machines that can receive reinforcement to classify sequences of gameplay actions that are indicative of a player action performed by a player and sequences of gameplay actions that are not indicative of a player action performed by a player) and unsupervised learning algorithms (such as but not limited to linear classifiers that utilize statistical classification of data relating to historical player actions to classify sequences of gameplay actions that are indicative of a player action performed by a player and agent player actions that are not indicative of a sequence of gameplay actions that are likely to be performed by a player). In many embodiments, an agency module that configures an agent player profile of an external agent can interface with information that is sent from a user interface to a GWE and/or ESE to implement an agent whose agent player actions configured by an agent player profile take the place of player actions that can otherwise be generated by a player via a user interface. In certain embodiments, an agency module can enable a player to activate or deactivate an external agent, where deactivating an external agent can enable the player to directly manipulate a gameplay environment with player actions in lieu of agent player actions. The manner in which an agency module functions in an autonomous agent hybrid game in order to implement an external agent in accordance with an embodiment of the invention Is conceptually illustrated in FIG. 14. An agency module 1402 for an external agent can use player instructions via a user interface 1408 to configure an agent player profile for the external agent player profile in accordance with at least one agent player profile configuration rule. In certain embodiments, process maps 1410 can be utilized to integrate an entertainment game executed by an ESE 1406 within the game world operating system provided by the GWE 1404. In particular embodiments, an agency module can monitor the configuration of an agent player profile to determine the degree to which an agent player profile is configured, such as but not limited to the degree to which an agent player profile utilizes default settings as contrasted with settings that are configured by a player.

Although various components of agency modules are discussed above, agency modules can be configured in any manner within an autonomous agent hybrid game as appropriate to the specification of a specific application in accordance with embodiments of the invention. In certain embodiments, agent player profiles can configure external agents or internal agents in different configurations for different autonomous agent hybrid game gameplay applications. Examples of autonomous agent hybrid games of different gameplay themes are discussed below.

Autonomous Agent Hybrid Game Gameplay Themes

An agency module in accordance with many embodiments of the invention is constructed to enable autonomous agent hybrid game gameplay within the context of an entertainment game gameplay theme by allocating a gambling game agent wager payout resulting from at least one agent player action generated from an agent player profile configured by a player of the autonomous agent hybrid game. In certain embodiments, a military tank game gameplay theme can be implemented by an autonomous agent hybrid game. In the tank game gameplay theme, a minimum RWC commitment can be used in order to initiate gameplay, such as but not limited to 20 credits of RWC. In certain embodiments, a player can put in an amount of RWC above the minimum commitment (such as but not limited to 30 credits of RWC) to enjoy the benefit of the additional RWC during gameplay. An autonomous agent hybrid game can include a host mode that enables a player to choose from a number of choices as to a specific theatre of war, such as but not limited to the WWII Western Front, WWII Eastern Front, WWII North African Front. A player can then begin to configure an agent player profile, such as the configuration for at least one tank that can be utilized as an agent during autonomous agent hybrid game gameplay. In configuring the tank's agent player profile, an agency module can configure the tank's agent player profile using at least one agent player profile configuration rule based upon player instructions received at a user interface. A player using the user interface can configure a tank's agent player profile by specifying various aspects of the tank, such as but not limited to various levels of armor, fuel capacity, speed, firepower, amount of ammunition available to the tank, a tank's aggressiveness in battle and particular tank commanders used to pilot a tank. Player instructions concerning a gameplay theme (such as but not limited to a tank's aggressiveness in battle and particular tank commanders to be utilized in battle) can be interpreted in accordance with at least one agent player profile configuration rule to configure an agent player profile that can be used to generate agent player actions in an entertainment game gameplay session (such as but not limited to modifying the rate at which attacking agent player actions are performed based upon a player instruction concerning aggressiveness or the identity of a particular tank commander used in battle).

In several embodiments, player instructions can configure an agent player profile to replicate aspects of a configuration of an agent player profile used in a previous entertainment game gameplay session. In certain embodiments, previous configurations of agent player profiles used by a player can be stored and associated with a player's player profile. An agent player profile configuration rule can be used to copy aspects of a stored agent player profile configuration to an agent player profile that is undergoing configuration based upon player instructions. In certain embodiments with the military tank game gameplay theme, a tank's agent player profile can be configured to replicate aspects of a configuration of a tank's agent player profile used in a previous entertainment game gameplay session. In several embodiments, a player can design a high-speed tank that is lightly armored with a small but highly accurate main gun, and outfitted it with twenty armor-piercing shells. Each shell can function as an EE where 1 unit of RWC is also consumed with each use of the shell. The player can also configure the tank's agent player profile with an aggressive commander highly skilled at maneuvering with moderate weapon targeting abilities at the helm of the tank, where the configuration for the tank's agent player profile associated with this commander is loaded from a previous gameplay session. In certain embodiments, a player can expend RWC or GWC in order to make other configurations to the tank's agent player profile, such as to upgrade the tank or utilize a more experienced crew. For example, a player can expend 10 units of GWC to outfit the tank with an engine set that is 10% more fuel-efficient. In particular embodiments, a user interface can also provide feedback to a player concerning the configuration of an agent player profile, such as by presenting information that can inform a player as to an affect on entertainment game gameplay or gambling game gameplay that can result with a particular configuration for an agent player profile.

In several embodiments with the tank themed entertainment game, a player can release a tank into the field of battle after the tank's agent player profile is configured. The player can observe the tank's progress on a user interface representative of a map, along with various metrics related to the tank's gameplay progress, such as but not limited to fuel remaining, shells remaining, armor damage and kills achieved. The player can interact with the user interface to alter the player's view of the tank from the first to third person relative to the tank. In certain embodiments, the field of battle can include a fixed area of terrain occupied by the player's tank, opposition tanks, friendly tanks and a range of obstacles. As the tank is an agent, the player does not directly control the tank's actions within the entertainment game gameplay session. The tank can progress within the entertainment game gameplay session (such as but not limiting to moving, firing, retreating or taking evasive action) in response to the tank's agent player profile. In certain embodiments, each time the tank fires a shell, EE is consumed and a gambling game is initiated with an agent wager. Payouts from the agent wager can also add an amount of EE to the agent player profile that can be utilized in the entertainment game by the tank, such as additional shells that appear in a tank's magazine. Also, GWC can be accumulated as a function of the tank's performance in the field of battle and can accrue to the player's player profile. In many embodiments, the tank can continue to progress in the entertainment game until the tank is destroyed, retreats, is out of ammunition, or has accomplished its goal of the entertainment game gameplay session.

In several embodiments, a player can communicate with the tank during the entertainment game gameplay session. A player can take a role as a general behind the line of battle. The player can attempt to communicate with a tank from the user interface (such as but no limited to where the communications simulate radio communications) to send specific messages to the tank. These messages can be specific to in-battle tactics (such as but not limited to a command to retreat, move to a particular area, attack a structure, load ammunition at a particular location on the gameplay map or fire at will). The tank can process and respond to the communications from the player in accordance with the tank's agent player profile. In certain embodiments, the entertainment game can simulate battlefield conditions by causing certain communications to be lost and not delivered to particular tanks (such as but not limited to when a tank is out of radio contact).

In many embodiments, a military strategy based gameplay theme with an external agent can be implemented by an autonomous agent hybrid game. The military strategy based gameplay theme can utilize an external agent whose agent player profile is configured in accordance with an agent player profile configuration rule that utilizes historical player instructions. The historical player instructions can span the course of a single or several gameplay sessions that a player is engaged in. In several embodiments, an agent player profile can be configured with a set of rules reflective of a player's preferred strategy. In several embodiments, a player can configure an agent player profile of an external agent by configuring the agent player profile with an agent player profile configuration rule that utilizes historical player instructions. Upon commencement of an entertainment game gameplay session, a player can release the external agent to progress in the entertainment game gameplay session in a role similar to one that can be taken by the player and to collect payouts from agent wagers triggered by an agent gameplay gambling event occurrence based upon an agent player action. A player can also control the progress of the entertainment game gameplay session such as by ending or pausing the entertainment game gameplay session. In certain embodiments, a player can also place wagers on the gameplay progress of an agent, such as but not limited to whether the agent will win or lose a head to head game with another player.

In several embodiments, a battling robots gameplay theme can be implemented by an autonomous agent hybrid game. The battling robots gameplay theme can be implemented by configuring an agent player profile for each robot, where each robot is an agent, which can battle with other robots. A robot can have two types of EE, a weapon based EE and an armor based EE. As an entertainment game gameplay session progresses, a robot can attack with weapons and expend weapons EE, or defend by taking armor damage and expend armor EE. Also, each hit taken by the armor can be an agent gameplay gambling event occurrence that triggers an agent wager with wager terms using RWC associated with armor while each use of the weapons EE is an agent gameplay gambling event occurrence that triggers an agent wager with wager terms using RWC associated with weapons that are more favorable than the wager terms associated with armor.

In a number of embodiments, an adventure role playing game gameplay theme can be implemented by an autonomous agent hybrid game. In certain embodiments, an adventure themed entertainment game can enable a player to attack monsters with an agent that fights alongside the player. The agent can have two types of EE, a weapon based EE and an armor based EE. During the entertainment game gameplay session, the agent can attack creatures alongside the player with weapons, expending weapon EE, or defend by taking armor damage, expending armor EE. Also, each hit taken by the armor can be an agent gameplay gambling event occurrence that triggers an agent wager with wager terms using RWC associated with armor while each use of the weapons EE is an agent gameplay gambling event occurrence that triggers an agent wager with wager terms using RWC associated with weapons that are more favorable than the wager terms associated with armor.

Although various constructions of agency modules are discussed above, agency modules can be constructed to facilitate autonomous agent hybrid game gameplay with various gameplay themes as appropriate to the specifications of a specific application in accordance with embodiments of the invention. In certain embodiments, an agency module can implement any variation of a competition themed entertainment game (such as but not limited to a horse racing gameplay theme, cock fighting gameplay theme or a boxing gameplay theme) where a player configures an agent (such as but not limited to a racehorse, rooster or a boxer) to compete in a competition with other players. Processing apparatuses that can be implemented in an autonomous agent hybrid game are discussed below.

Processing Apparatus

Figure 15:
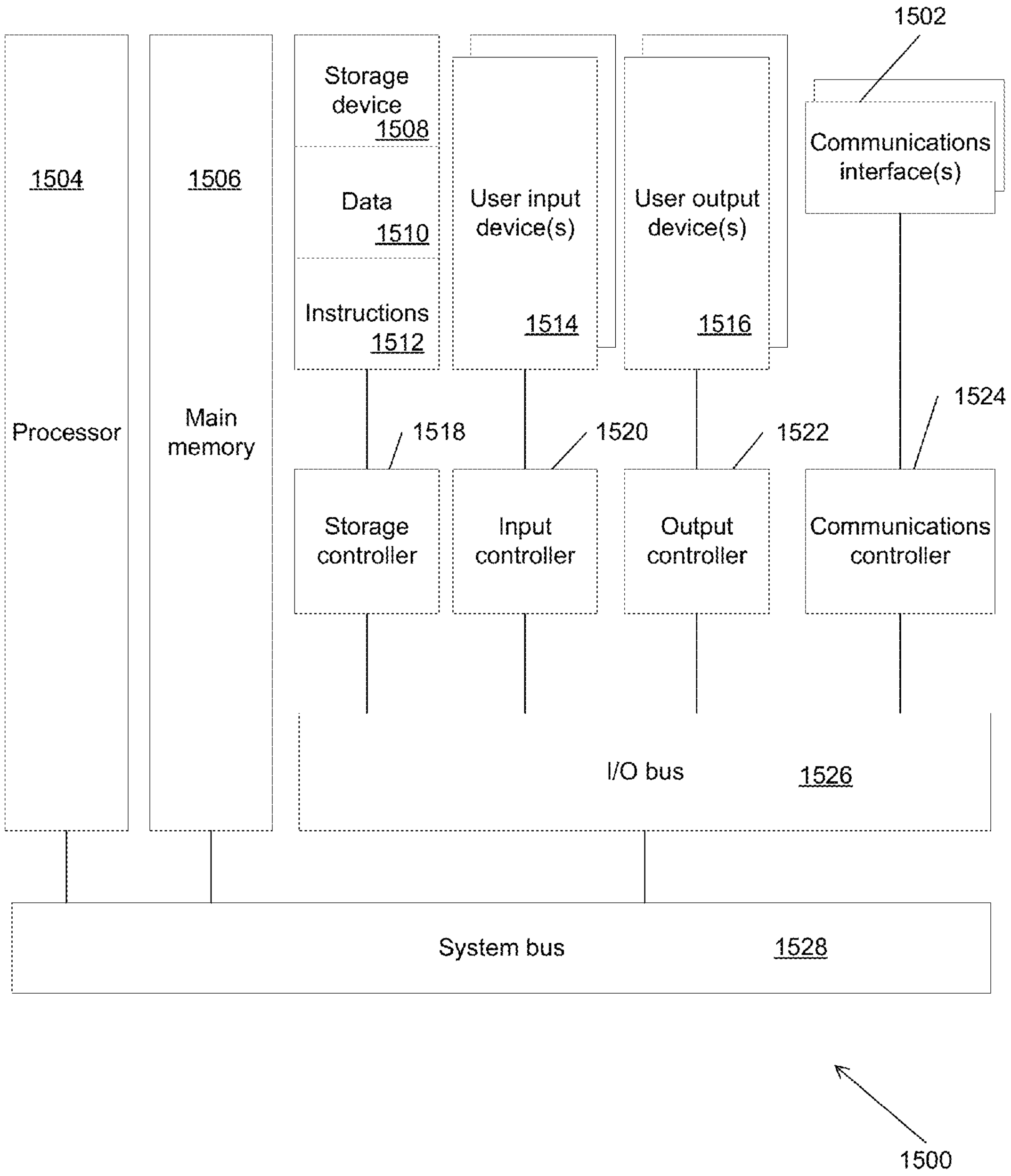
FIG. 15 illustrates a hardware architecture diagram of a processing apparatus utilized in the implementation of an autonomous agent hybrid game in accordance with an embodiment of the invention.

Any of a variety of processing apparatuses can host various components of an autonomous agent hybrid game in accordance with embodiments of the invention. In several embodiments, these processing apparatuses can include, but are not limited to, a video gaming console, a gaming machine, a general purpose computer, a computing device, a controller and/or a mobile computing device, such as a tablet computer, a personal data assistant, or a smartphone. A processing apparatus that is constructed to implement an autonomous agent hybrid game in accordance with an embodiment of the invention is illustrated in FIG. 15. In the processing apparatus 1500, a processor 1504 is coupled to a memory 1506 by a bus 1528. The processor 1504 is also coupled to non-transitory processor-readable storage media, such as a storage device 1508 that stores processor-executable instructions 1512 and data 1510 through the system bus 1528 to an I/O bus 1526 through a storage controller 1518. The processor 1504 is also coupled to one or more interfaces that can be used to connect the processor to other processing apparatuses as well as networks as described herein. The processor 1504 is also coupled via the bus to user input devices 1514, such as tactile devices including but not limited to keyboards, keypads, foot pads, touch screens, and/or trackballs, as well as non-contact devices such as audio input devices, motion sensors and motion capture devices that the processing apparatus can use to receive inputs from a user when the user interacts with the processing apparatus. The processor 1504 is connected to these user input devices 1514 through the system bus 1528, to the I/O bus 1526 and through the input controller 1520. The processor 1504 is also coupled via the bus to user output devices 1516 such as (but not limited to) visual output devices, audio output devices, and/or tactile output devices that the processing apparatus uses to generate outputs perceivable by the user when the user interacts with the processing apparatus. In several embodiments, the processor is coupled to visual output devices such as (but not limited to) display screens, light panels, and/or lighted displays. In a number of embodiments, the processor is coupled to audio output devices such as (but not limited to) speakers, and/or sound amplifiers. In many embodiments, the processor is coupled to tactile output devices like vibrators, and/or manipulators. The processor is connected to output devices from the system bus 1528 to the I/O bus 1526 and through the output controller 1522. The processor 1504 can also be connected to a communications interface 1502 from the system bus 1528 to the I/O bus 1526 through a communications controller 1524.

In various embodiments, a processor loads the instructions and the data from the storage device into the memory and executes the instructions and operates on the data to implement the various aspects and features of the components of a gaming system as described herein. The processor uses the user input devices and the user output devices in accordance with the instructions and the data in order to create and operate user interfaces for players, casino operators, and/or owners as described herein.

Although the processing apparatus is described herein as being constructed from a processor and instructions stored and executed by hardware components, the processing apparatus can be composed of only hardware components in accordance with many embodiments. In addition, although the storage device is described as being coupled to the processor through a bus, those skilled in the art of processing apparatuses will understand that the storage device can include removable media such as but not limited to a USB memory device, an optical CD ROM, magnetic media such as tape and disks. Also, the storage device can be accessed through one of the interfaces or over a network. Furthermore, any of the user input devices or user output devices can be coupled to the processor via one of the interfaces or over a network. In addition, although a single processor is described, those skilled in the art will understand that the processor can be a controller or other computing device or a separate computer as well as be composed of multiple processors or computing devices.

In numerous embodiments, any of an RWE, GWE or ESE as described herein can be implemented on multiple processing apparatuses, whether dedicated, shared or distributed in any combination thereof, or can be implemented on a single processing apparatus. In addition, while certain aspects and features of element management processes described herein have been attributed to an RWE, GWE, or ESE, these aspects and features can be implemented in a hybrid form where any of the features or aspects can be performed by any of a RWE, GWE, ESE within an autonomous agent hybrid game without deviating from the spirit of the invention.

While the above description contains many specific embodiments of the invention, these should not be construed as limitations on the scope of the invention, but rather as an example of one embodiment thereof. It is therefore to be understood that the present invention can be practiced otherwise than specifically described, without departing from the scope and spirit of the present invention. Thus, embodiments of the present invention should be considered in all respects as illustrative and not restrictive.

What is claimed is:

1. An autonomous agent hybrid system, comprising:

a real world controller constructed to provide a randomly generated payout of real world credits from a wager of real world credits in a gambling game;

an entertainment software controller constructed to execute an entertainment game providing outcomes based upon at least one autonomous agent action taken by an autonomous agent in the entertainment game; and a game world controller coupled to the entertainment software controller and the real world controller via a network, the game world controller constructed to trigger the wager of real world credits in the gambling game on the basis of utilization of an enabling element by the autonomous agent, wherein the game world controller utilizes an agency module that:

configures an autonomous agent player profile for the autonomous agent, where the autonomous agent action is determined by the configuration of the autonomous agent player profile;

detects via the network from the entertainment software controller the autonomous agent action taken by the autonomous agent in the entertainment game where the autonomous agent action is a direct utilization by the autonomous agent of the enabling element within the entertainment game, wherein the autonomous agent action is taken by the autonomous agent within the entertainment game without the player's supervision; and communicates, to the real world controller, an agent wager based on the autonomous agent action.

2. The autonomous agent hybrid system of claim 1, wherein the agency module configures the autonomous agent player profile based upon player instructions received via a user interface during entertainment game gameplay.

3. The autonomous agent hybrid system of claim 1, wherein the autonomous agent player profile is configured with an allocation of real world credits from the player profile associated with the player instructions, where the real world credits allocated to the autonomous agent player profile are configured to be wagered in the agent wager.

4. The autonomous agent hybrid system of claim 1, wherein the agent player action involved with skillful execution of the entertainment game is configured to mimic historical player instructions based upon an agent player profile configuration rule that utilizes historical player instructions.

5. The autonomous agent hybrid system of claim 1, wherein the autonomous agent player action involved with skillful execution of the entertainment game during entertainment game gameplay executed by the entertainment software controller is determined by a configuration of logic stored in the agent player profile.

6. The autonomous agent hybrid system of claim 1, wherein the agent wager is made with wager terms generated with a wager term configuration rule based upon the agent player profile.

7. The autonomous agent hybrid system of claim 6, wherein the wager terms are configured in accordance with a wager term configuration rule based upon an amount of real world credits associated with the agent player profile.

8. The autonomous agent hybrid system of claim 6, wherein different agent player profiles yield different wager terms for the agent wager.

9. The autonomous agent hybrid system of claim 8, wherein different autonomous agent player actions yield different wager terms for the agent wager in accordance with a wager term configuration rule.

10. The autonomous agent hybrid system of claim 1, wherein the player associated with the player instructions and the autonomous agent associated with the autonomous agent player profile are engaged in the same entertainment game gameplay session.

11. An autonomous agent hybrid system, comprising:

an entertainment software controller constructed to execute an entertainment game providing outcomes based upon at least one autonomous agent action taken by an autonomous agent in the entertainment game; and a game world controller coupled, via a network, to the entertainment software controller and to a real world controller providing a randomly generated payout of real world credits from a wager of real world credits, the game world controller constructed to trigger the wager of real world credits on the basis of utilization of an enabling element by the autonomous agent, wherein the game world controller utilizes an agency module that:

configures an autonomous agent player profile for the autonomous agent, where the autonomous agent action is determined by the configuration of the autonomous agent player profile;

detects via the network from the entertainment software controller the autonomous agent action taken by the autonomous agent in the entertainment game where the autonomous agent action is a direct utilization by the autonomous agent of the enabling element within the entertainment game, wherein the autonomous agent action is taken by the autonomous agent within the entertainment game without the player's supervision; and communicates, to the real world controller, an agent wager based on the autonomous agent action.

12. The autonomous agent hybrid system of claim 11, wherein the agency module configures the autonomous agent player profile based upon player instructions received via a user interface during entertainment game gameplay.

13. The autonomous agent hybrid system of claim 11, wherein the autonomous agent player profile is configured with an allocation of real world credits from the player profile associated with the player instructions, where the real world credits allocated to the autonomous agent player profile are configured to be wagered in the agent wager.

14. The autonomous agent hybrid system of claim 11, wherein the agent player action involved with skillful execution of the entertainment game is configured to mimic historical player instructions based upon an agent player profile configuration rule that utilizes historical player instructions.

15. The autonomous agent hybrid system of claim 11, wherein the autonomous agent player action involved with skillful execution of the entertainment game during entertainment game gameplay executed by the entertainment software controller is determined by a configuration of logic stored in the agent player profile.

16. The autonomous agent hybrid system of claim 11, wherein the agent wager is made with wager terms generated with a wager term configuration rule based upon the agent player profile.

17. The autonomous agent hybrid system of claim 16, wherein the wager terms are configured in accordance with a wager term configuration rule based upon an amount of real world credits associated with the agent player profile.

18. The autonomous agent hybrid system of claim 16, wherein different agent player profiles yield different wager terms for the agent wager.

19. The autonomous agent hybrid system of claim 18, wherein different autonomous agent player actions yield different wager terms for the agent wager in accordance with a wager term configuration rule.

20. The autonomous agent hybrid system of claim 11, wherein the player associated with the player instructions and the autonomous agent associated with the autonomous agent player profile are engaged in the same entertainment game gameplay session.

* * * * *